(12) United States Patent
Hasegawa et al.

(10) Patent No.: US 7,539,599 B2
(45) Date of Patent: May 26, 2009

(54) ABNORMALITY DIAGNOSING METHOD, CONDITION APPRAISAL APPARATUS, IMAGE FORMING APPARATUS, MANAGEMENT APPARATUS AND MANAGEMENT SYSTEM

(75) Inventors: Kunio Hasegawa, Tokyo (JP); Yasuhiko Saka, Kanagawa (JP); Kohsuke Tsunashima, Chiba (JP); Mitsuo Hasebe, Tokyo (JP); Shigeru Mita, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 595 days.

(21) Appl. No.: 11/055,773

(22) Filed: Feb. 11, 2005

(65) Prior Publication Data

US 2005/0193027 A1    Sep. 1, 2005

(30) Foreign Application Priority Data

Feb. 12, 2004    (JP) ............................. 2004-035817

(51) Int. Cl.
*G06F 15/00* (2006.01)
*G06F 11/30* (2006.01)

(52) U.S. Cl. .................. 702/185; 702/110; 702/111; 702/188; 700/9; 700/10

(58) Field of Classification Search ......... 702/185–190, 702/35, 110–112; 700/9, 10, 80; 382/182; 356/601; 358/518, 537; 707/200; 399/9, 399/12, 16
See application file for complete search history.

(56) References Cited

U.S. PATENT DOCUMENTS

| | | | |
|---|---|---|---|
| 4,578,331 A | 3/1986 | Ikeda et al. | |
| 4,772,918 A | 9/1988 | Karasawa et al. | |
| 4,907,078 A | 3/1990 | Hasebe | |
| 4,916,547 A | 4/1990 | Katsumata et al. | |
| 4,951,160 A | 8/1990 | Nagahara et al. | |
| 5,003,382 A | 3/1991 | Omi et al. | |
| 5,087,968 A | 2/1992 | Omi et al. | |
| 5,132,787 A | 7/1992 | Omi et al. | |
| 5,298,944 A | 3/1994 | Sawayama et al. | |
| 5,805,314 A | 9/1998 | Abe et al. | |
| 6,829,389 B1 * | 12/2004 | Arakawa et al. | ............ 382/218 |
| 2005/0193027 A1 * | 9/2005 | Hasegawa et al. | ............ 707/200 |

FOREIGN PATENT DOCUMENTS

| | | |
|---|---|---|
| JP | 5-100507 | 4/1993 |
| JP | 5-100517 | 4/1993 |
| JP | 5-281809 | 10/1993 |
| JP | 7-36323 | 2/1995 |
| JP | 7-36323 | 7/1995 |
| JP | 8-30152 | 2/1996 |

(Continued)

OTHER PUBLICATIONS

U.S. Appl. No. 11/857,132, filed Sep. 18, 2007, Satoh, et al.

*Primary Examiner*—Eliseo Ramos Feliciano
*Assistant Examiner*—Phuong Huynh
(74) *Attorney, Agent, or Firm*—Oblon, Spivak, McClelland, Maier & Neustadt, P.C.

(57) ABSTRACT

Abnormality diagnosing method in which a highly reliable abnormality diagnosis of an image forming apparatus can be initiated immediately following the delivery of the image forming apparatus to a user.

34 Claims, 29 Drawing Sheets

FOREIGN PATENT DOCUMENTS

| | | |
|---|---|---|
| JP | 8-137344 | 5/1996 |
| JP | 2793419 | 6/1998 |
| JP | 2000-89623 | 3/2000 |
| JP | 2000-259222 | 9/2000 |
| JP | 2000-270141 | 9/2000 |
| JP | 2001-175328 | 6/2001 |
| JP | 2001-356655 | 12/2001 |
| JP | 2002-283683 | 10/2002 |
| JP | 2002-314202 | 10/2002 |
| JP | 2004-53944 | 2/2004 |

* cited by examiner

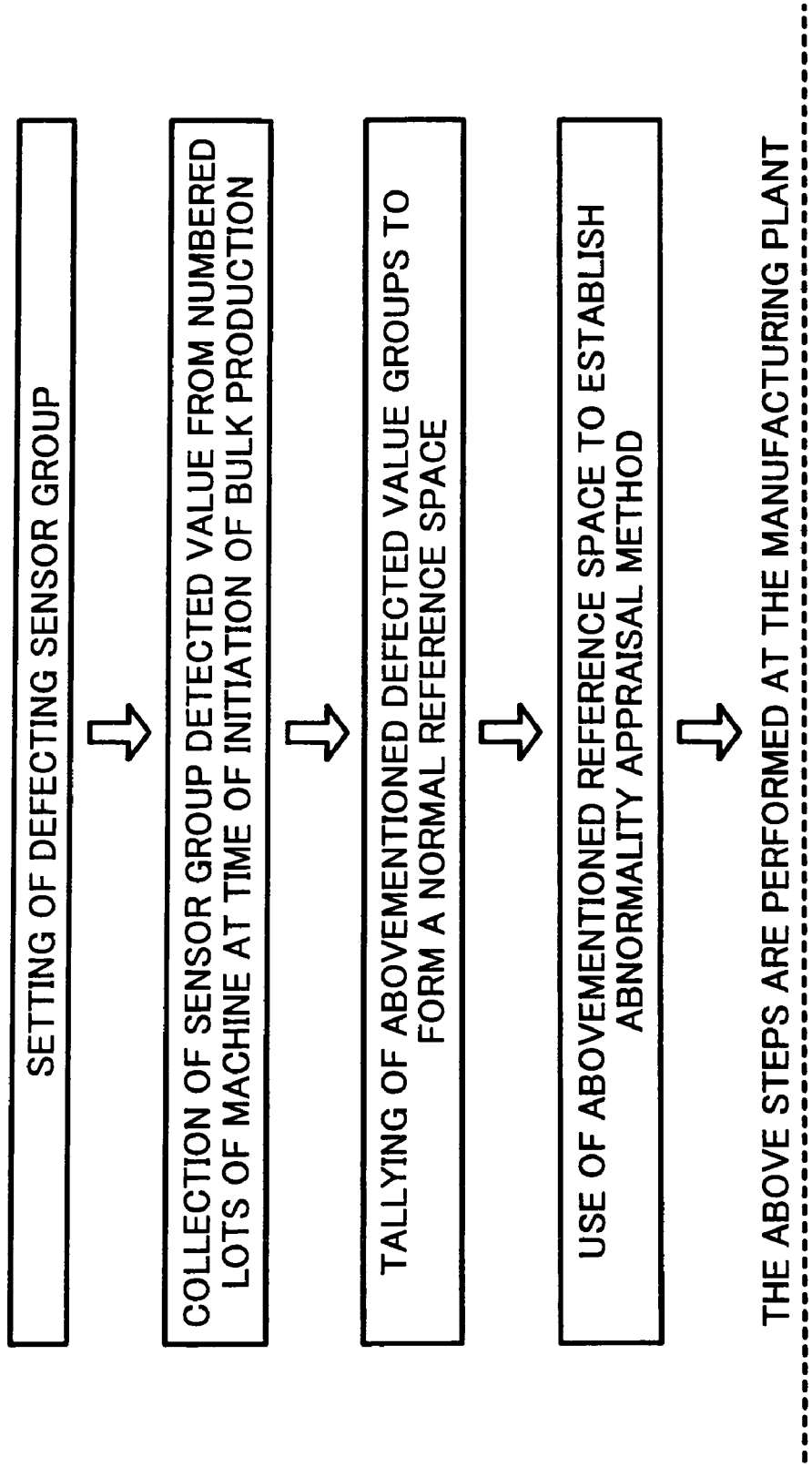

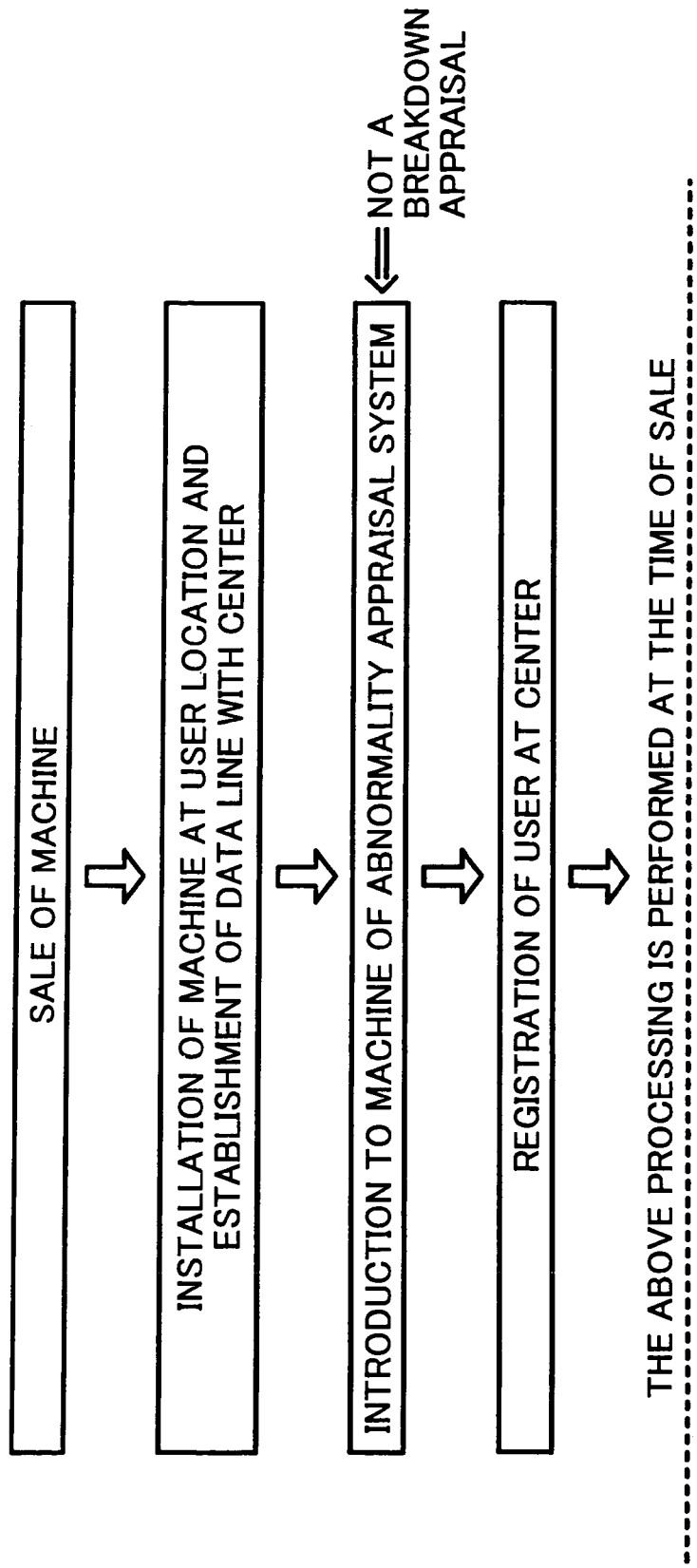

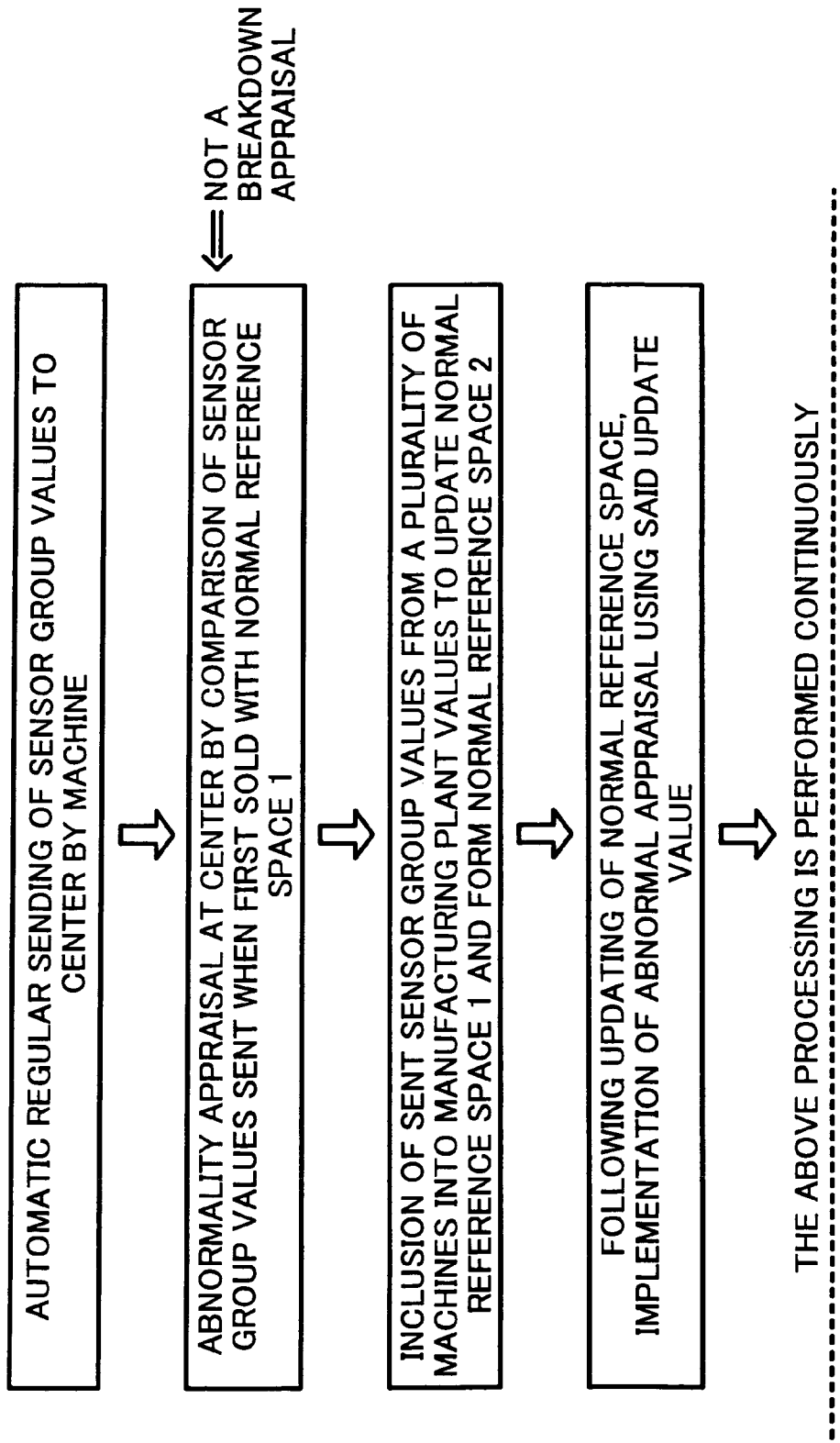

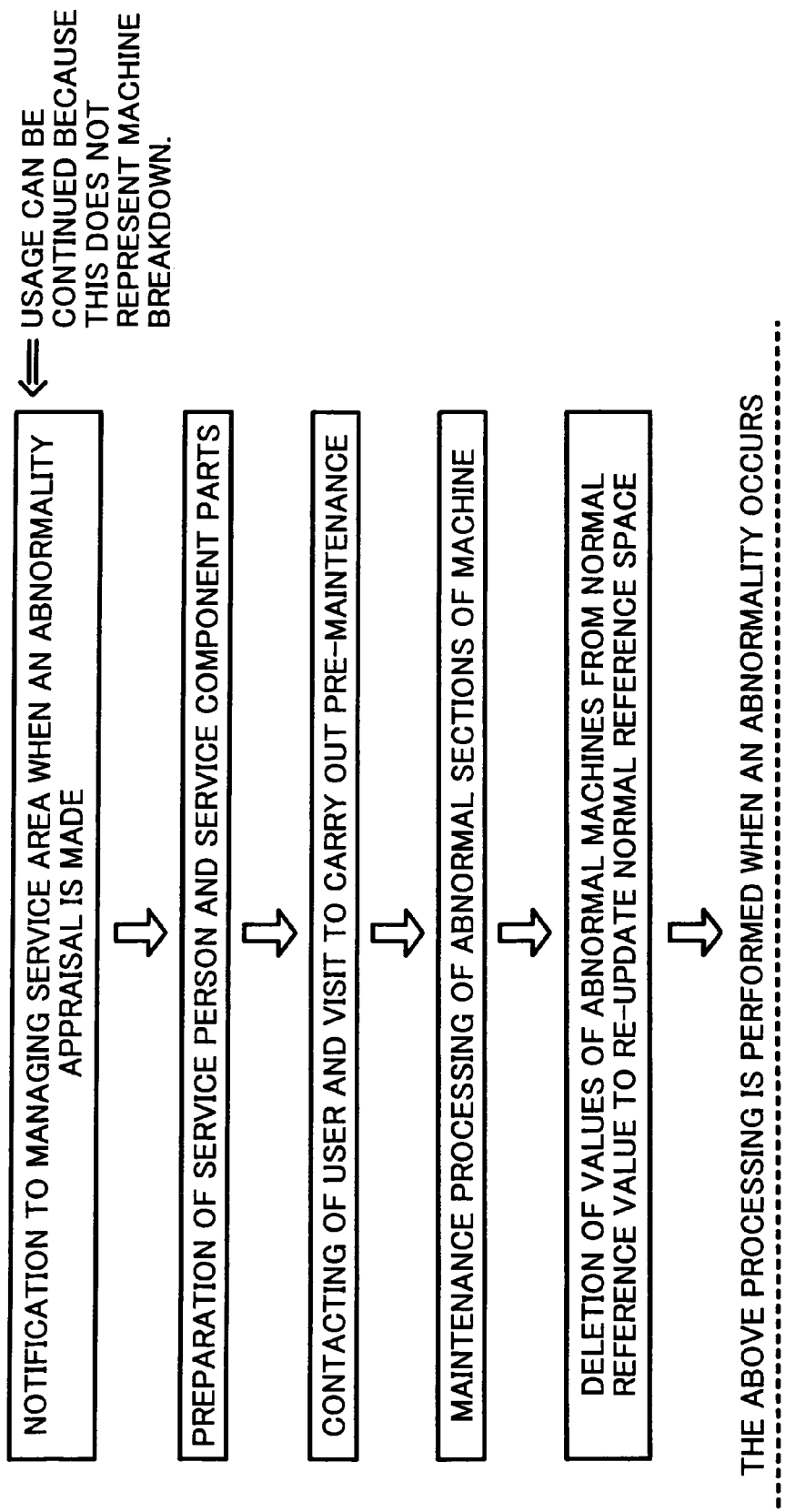

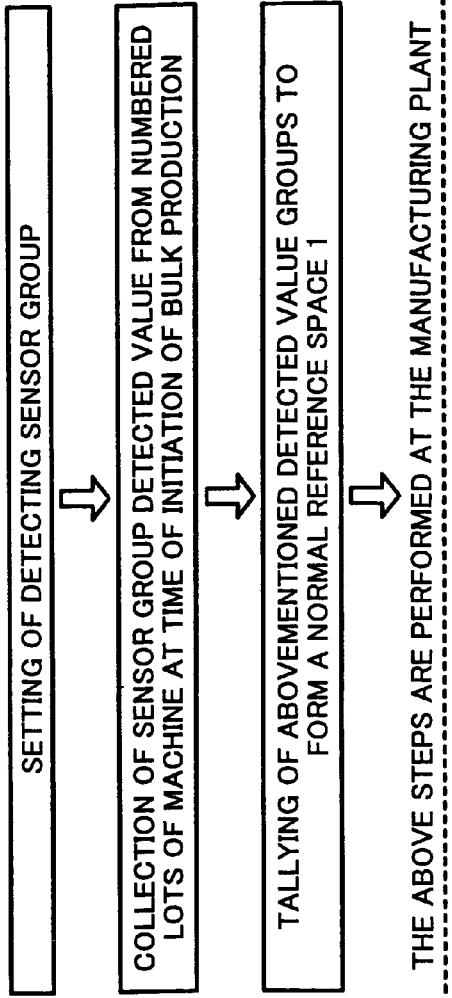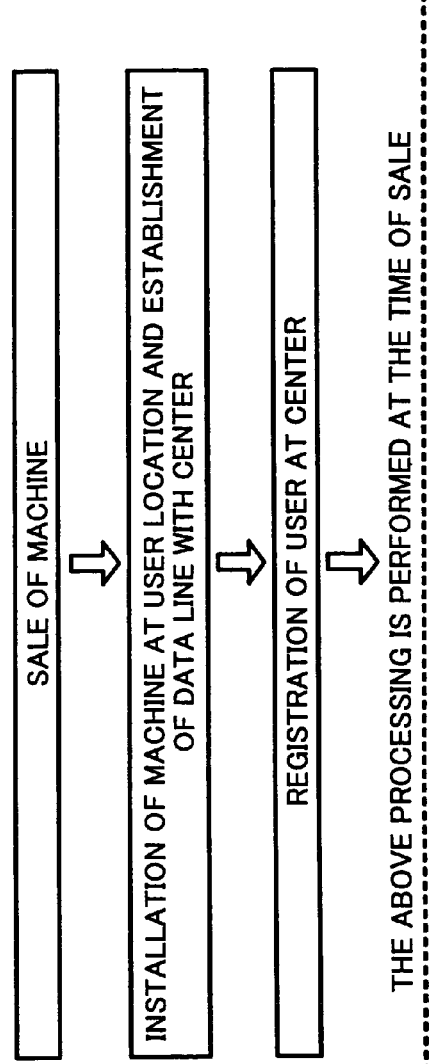

FIG. 32

| GROUP NUMBER (i) | INFORMATION TYPE (j) | | | |
| --- | --- | --- | --- | --- |
| | (1) | (2) | ... | (k) |
| 1 | $y_{11}$ | $y_{12}$ | ... | $y_{1k}$ |
| 2 | $y_{21}$ | $y_{22}$ | ... | $y_{2k}$ |
| .. | .. | .. | ... | .. |
| n | $y_{n1}$ | $y_{n2}$ | ... | $y_{nk}$ |
| AVERAGE | $y_1$ | $y_2$ | ... | $y_k$ |
| STANDARD DEVIATION | $\sigma_1$ | $\sigma_2$ | ... | $\sigma_k$ |

FIG. 33

| GROUP NUMBER (i) | INFORMATION TYPE (j) | | | |
| --- | --- | --- | --- | --- |
| | (1) | (2) | ... | (k) |
| 1 | $y_{11}$ | $y_{12}$ | ... | $y_{1k}$ |
| 2 | $y_{21}$ | $y_{22}$ | ... | $y_{2k}$ |
| .. | .. | .. | ... | .. |
| n | $y_{n1}$ | $y_{n2}$ | ... | $y_{nk}$ |
| AVERAGE | 0 | 0 | ... | 0 |
| STANDARD DEVIATION | 1 | 1 | ... | 1 |

FIG. 34

$$Y_{ij} = (y_{ij} - y_j)/\sigma_j$$

$$r_{pq} = r_{qp} = \frac{\sum_{i=1}^{n}(Y_{ip}Y_{iq})}{(\sum_{i=1}^{n} Y_{ip}^2 \sum Y_{iq}^2)^{1/2}}$$

$$R = \begin{bmatrix} 1 & r_{12} & r_{13} & \cdots & r_{1k} \\ r_{21} & 1 & r_{23} & \cdots & r_{2k} \\ r_{31} & r_{32} & 1 & \cdots & r_{3k} \\ \cdots & \cdots & \cdots & \cdots & \cdots \\ r_{k1} & r_{k2} & r_{k3} & \cdots & 1 \end{bmatrix}$$

$$A = \begin{bmatrix} a_{11} & a_{12} & a_{13} & \cdots & a_{1k} \\ a_{21} & a_{22} & a_{23} & \cdots & a_{2k} \\ a_{31} & a_{32} & a_{33} & \cdots & a_{3k} \\ \cdots & \cdots & \cdots & \cdots & \cdots \\ a_{k1} & a_{k2} & a_{k3} & \cdots & a_{kk} \end{bmatrix}$$

$$X_j = (x_j - y_j)/\sigma_j$$

$$D^2 = (1/k)\sum_{p=1}^{k}\sum_{q=1}^{k} a_{pq} X_p X_q$$

Eq. (6)

ABNORMALITY DIAGNOSING METHOD, CONDITION APPRAISAL APPARATUS, IMAGE FORMING APPARATUS, MANAGEMENT APPARATUS AND MANAGEMENT SYSTEM

BACKGROUND OF THE INVENTION

1. Field of the Invention

The present invention relates to electronic devices including image forming apparatus such as printers, copiers and facsimile machines, as well as computer apparatus, home electrical devices and communication devices. In addition, the present invention relates to an electronic apparatus abnormality diagnosing method, a condition appraisal apparatus for appraising the condition of an electronic device, a management apparatus for managing a plurality of electronic devices by way of a communication line, and an electronic device management system.

2. Description of the Related Art

The use of image forming apparatus of electronic devices of this type and, in particular, electronic copier system image forming apparatus, necessitates maintenance that includes the replacement of consumables such as toner and light-sensitive materials as well as repair when breakdown occurs. When breakdown occurs the complete function or a partial function of the apparatus ceases from the time the breakdown occurs until the repair thereof has been completed, and this creates a significant time loss to the user. Thereupon, it is desirable for the occurrence of an abnormal condition in an image forming apparatus such as breakdown or the onset of the end-life of the unit and component parts to be able to be predicted so that, by the administering of necessary measures such as maintenance in advance, this so-called downtime amount can be reduced.

A hitherto known method for the prediction of the occurrence of an abnormal condition such as the abovementioned breakdown or the end-life of a component part is a method in which statistical processing or deduction of a plurality of information such as sensing information detected by various sensors in the image forming apparatus is implemented (see, for example, Japanese Laid-Open Patent Application No. 2001-175328).

However, although the possibility of an abnormal condition occurring can be predicted using the abovementioned method described in Japanese Laid-Open Patent Application No. 2001-175328, the method is unable to predict the specific period in which the abnormal condition will occur. If the specific period in which the abnormal condition is to occur in an image forming apparatus can be predicted, an examination of the cause and the details of the predicted abnormality can be initiated and, based on the results of this examination, the required level of emergency can be adjudged to ensure that the maintenance is implemented in the appropriate time period. Thereupon, it is desirable to be able to predict not only the possibility of an abnormal condition such as breakdown occurring in an image forming apparatus but also the time period in which said abnormal condition will occur.

Thereupon, by way of example, Japanese Patent No. 2003-184929 proposes a method for predicting the occurrence of an abnormality (abnormality diagnosing method) in which the time period of the occurrence of the abnormality can be predicted.

In this method data of a plurality of types of information related to the condition of the image forming apparatus is acquired, and an index value that changes in accordance with changes in condition of the device is calculated from this data of a plurality of types of information. More specifically, when the image forming apparatus that serves as the subject of condition appraisal is deemed to be of a normal condition the abovementioned data of a plurality of types of information is acquired in a plurality of groups and, from a reference data group (parent group) made up of this data, an index value calculation equation for calculating the abovementioned index value which is a value that changes in response to changes in the condition of said apparatus is determined. Employing this index value calculation equation, the abovementioned index value is calculated for the abovementioned data of a plurality of types of information acquired about the image forming apparatus that serves as the subject of the condition appraisal. By virtue of the fact that changes over time in the calculated index value correspond to changes over time in the condition of the image forming apparatus in this way, an assumption is made that when the index value deviates by more than a set amount from the initial normal condition this will lead to the occurrence of some kind of abnormal condition in the image forming apparatus such as breakdown. In this method, because an appraisal is made of future changes in the condition of the image forming apparatus based on data of the changes over time of the index value, not only is it possible to diagnosis the occurrence of an abnormal condition such as breakdown but it is also possible to predict the time period when this abnormal condition will occur. Because diagnosis of the occurrence of abnormality is possible in this way, the level of emergency thereof can be adjudged to ensure that the maintenance is carried out at the appropriate time.

However, the following problems remain in the adoption of an abnormality diagnosing method such as the method of the abovementioned proposal in image forming apparatus actually delivered to a user. Using this abnormality diagnosing method, in order to determine the abovementioned index calculation value equation, the data of a plurality of types of information about an image forming apparatus deemed to be of normal condition must be acquired in a plurality of groups in advance to prepare a reference data group. Moreover, it was clear as a result of the implementation of abnormality diagnosing tests carried out by the inventors of the present application on an actual image forming apparatus that, as well as the determining of an index value calculation equation by which a highly reliable index value for condition appraisal and abnormality diagnosing could be calculated, the manner in which the abovementioned reference data group was constructed was also important. By way of example, it was clear that erroneous appraisals of the condition of the device and erroneous diagnosis of abnormalities occurred when the number of data from which the abovementioned reference data group is formed was small and this data included data acquired about image forming apparatus of different types. More particularly, there was found to be a problem in that, in the initiation of the bulk production of new types of image forming apparatus, it was difficult to guarantee the formation of a reference data group made up of sufficient quantity of data acquired about the same type of image forming apparatus whereby, following delivery, there were times when highly reliable abnormality diagnosis could not be implemented immediately after the delivery thereof.

It should be noted that these problems are not restricted to the application of the abovementioned abnormality diagnosing method on the abovementioned image forming apparatus and the same problems will arise in the application of the abovementioned abnormality diagnosing method on other electronic devices other than image forming apparatus.

SUMMARY OF THE INVENTION

The present invention is contrived with the foregoing in view. It is an object thereof to provide an abnormality diagnosing method, a condition appraisal apparatus, an image forming apparatus, a management apparatus and a management system in which, when the bulk production of a new type of electronic device is initiated, a highly reliable abnormality diagnosis of the electronic device can be initiated immediately after delivery of the electronic device to the user.

An abnormality diagnosing method of the present invention comprises a step of acquiring in advance a plurality of sets of data of a plurality of types of information related to the condition of an electronic device; a step of, based on a reference data group made up of the plurality of sets of data, determining an index value calculation equation for calculating an index value employed for the condition appraisal of the electronic devices; a step of acquiring the data of a plurality of types of information about the electronic device that serves as the subject for condition appraisal; a step of calculating an index value based on the index value calculation equation and the data of a plurality of types of information acquired about the electronic device that serves as the subject for condition appraisal; and a step of, based on the comparison results of the index value and a reference value established in advance, appraising the condition of the electronic device that serves as the subject for condition appraisal and diagnosing the occurrence of abnormality in said electronic devices. The acquisition of the plurality of sets of data that make up the reference data group is performed for a plurality of electronic devices of the same type as the electronic device that serves as the subject for condition appraisal during operation tests following the manufacture of the plurality of electronic devices about. The reference data group containing all of the plurality of sets of data acquired during the operation tests conducted on the plurality of electronic devices is employed as an initial reference data group for determining the index value calculation equation.

An electronic device condition appraisal apparatus of the present invention comprises data acquisition means for acquiring data of a plurality of types of information related to the condition of an electronic device; data storing means for storing reference data groups made up of the data of a plurality of sets of a plurality of types of information acquired for an electronic device that serves as the subject for appraisal; index value determining means for, based on the reference data group, determining an index value calculation equation for calculating an index value employed for the condition appraisal of the electronic device; index value calculation means for calculating an index value based on the index value calculation equation and the data of a plurality of types of information acquired for the electronic device that serves as the subject for condition appraisal; and appraisal means for, based on the comparison results of said calculated index value and a reference value established in advance, appraising the condition of the electronic device that serves as the subject for condition appraisal. The data storing means stores the reference data group containing all of the plurality of sets of data acquired during operation tests conducted following the manufacture of a plurality of electronic devices of the same type as the electronic device that serves as the subject for condition appraisal as an initial reference data group for determining the index value calculation equation.

An image forming apparatus of the present invention comprises condition appraisal means for appraising the condition of an apparatus; and image forming means for forming an image on a recording medium. The condition appraisal means comprises data acquisition means for acquiring data of a plurality of types of information related to the condition of an electronic device; data storing means for storing reference data groups made up of the data of a plurality of sets of a plurality of types of information acquired for an electronic device that serves as the subject for appraisal; index value determining means for, based on the reference data group, determining an index value calculation equation for calculating an index value employed for the condition appraisal of the electronic device; index value calculation means for calculating an index value based on the index value calculation equation and the data of a plurality of types of information acquired for the electronic device that serves as the subject for condition appraisal; and appraisal means for, based on the comparison results of the calculated index value and a reference value established in advance, appraising the condition of the electronic device that serves as the subject for condition appraisal. The data storing means stores the reference data group containing all of the plurality of sets of data acquired during operation tests conducted following the manufacture of a plurality of electronic devices of the same type as the electronic device that serves as the subject for condition appraisal as an initial reference data group for determining the index value calculation equation.

A management apparatus for the centralized management of the abnormality diagnoses of a plurality of electronic devices via a communication line in accordance with the present invention comprises communication means for communicating with the electronic devices or a condition appraisal apparatus for appraising the condition of the electronic devices; data storing means for storing a reference data group comprising data of a plurality of information acquired for the electronic devices; and control means for controlling the communication means and the data storing means in such a way that the data of a plurality of types of information acquired at prescribed update timings during operation tests conducted following the manufacture of the electronic devices is received from the electronic devices or the condition appraisal apparatus, and the received data is added to the reference data group to update the reference data group.

A management system for the centralized control of the abnormality diagnoses of a plurality of electronic devices by way of a communication line in accordance with the present invention comprises a management apparatus; and a plurality of electronic devices capable of communicating with the management apparatus by way of a communication line or a condition appraisal apparatus for appraising the condition of the electronic devices. The management apparatus comprises communication means for communicating with the electronic devices or a condition appraisal apparatus for appraising the condition of the electronic devices; data storing means for storing a reference data group comprising data of a plurality of information acquired for the electronic devices; and control means for controlling the communication means and the data storing means in such a way that the data of a plurality of types of information acquired at prescribed update timings during operation tests conducted following the manufacture of the electronic devices is received from the electronic devices or the condition appraisal apparatus, and the received data is added to the reference data group to update the reference data group.

BRIEF DESCRIPTION OF THE DRAWINGS

The above and other objects, features and advantages of the present invention will become more apparent form the following detailed description taken with the accompanying drawings in which:

FIGS. 30A to 30C are flowcharts illustrating the flow of the complete routine from the time of data accumulation when the machine (image forming apparatus) is shipped from the manufacturing plant until the service base has implemented maintenance processing;

FIGS. 31A to 31D are flowcharts illustrating the flow of the complete routine from the time of data accumulation when the machine (image forming apparatus) is shipped from the manufacturing plant until maintenance processing has been implemented by the service base of a modified example thereof;

FIG. 32 is a table showing the make-up of the information data acquired about a plurality of image forming apparatuses during operation tests;

FIG. 33 is a table showing the standardized results of the data of FIG. 32;

FIG. 34 is an equation (1) showing the standardized data;

FIG. 35 is an equation (2) showing the correlation coefficient between 2 groups of K-type data;

FIG. 36 is an equation (3) showing a correlation coefficient matrix;

FIG. 37 is an equation (4) showing an inverse matrix of the correlation coefficient matrix;

FIG. 38 is an equation (5) showing standardized data; and

FIG. 39 is an equation (6) for calculating the Mahalanobis distance that serves as the index value.

DESCRIPTION OF THE PREFERRED EMBODIMENTS

A description of the present invention is given below with reference to the diagrams.

Figure 1:
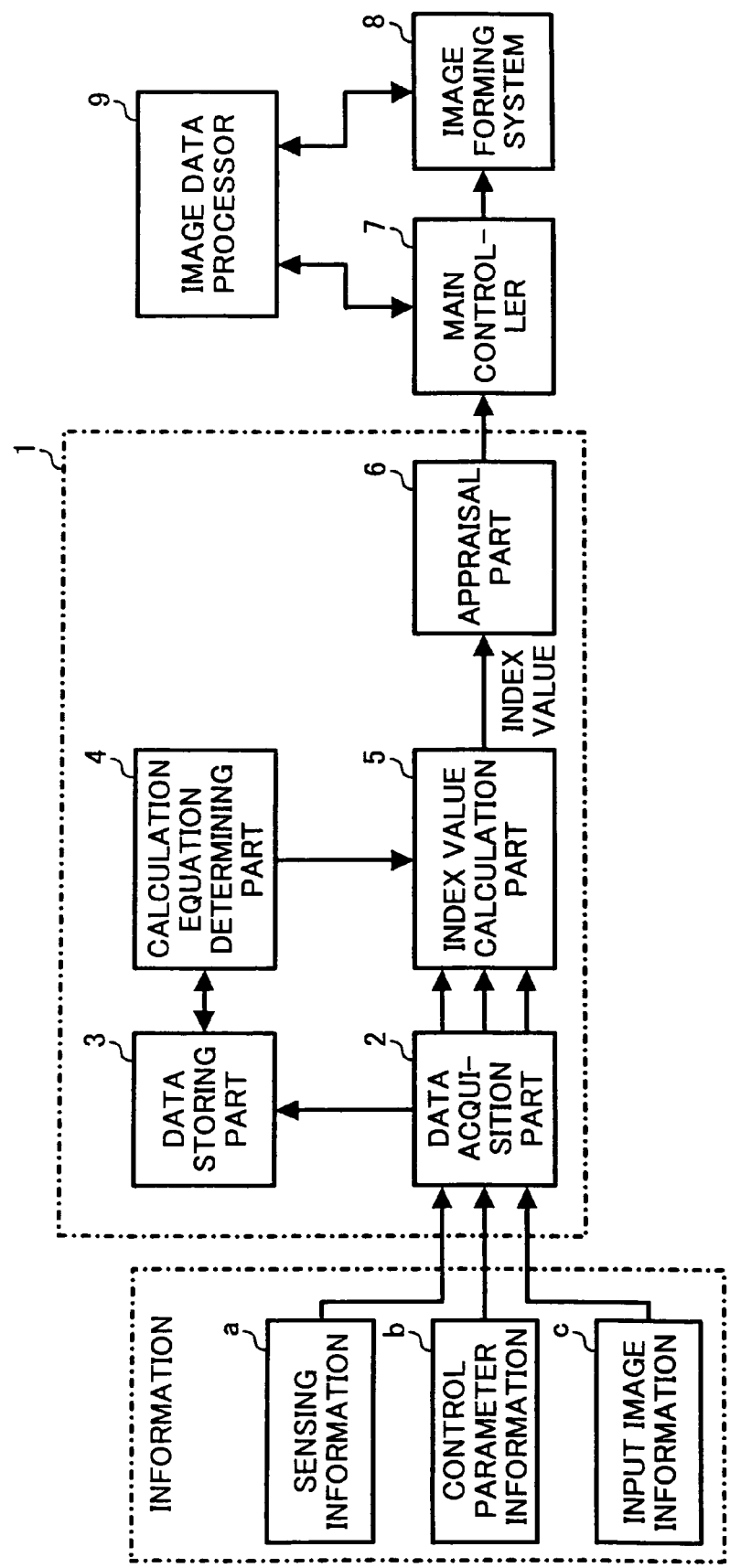
FIG. 1 is a block diagram of the fundamental constitution of an abnormality diagnosing system comprising a condition appraisal apparatus in which an abnormality diagnosing method is able to be implemented pertaining to the present invention.

FIG. 1 is a block diagram of the fundamental constitution of an abnormality diagnosing system comprising a condition appraisal apparatus in which an abnormality diagnosing method is able to be implemented pertaining to the present invention.

A condition appraisal apparatus 1 comprises a data acquisition part (data acquisition means) 2, a data storing part (data storing means) 3, a calculation equation determining part (data calculation equation determining means) 4, an index value calculation part (index value calculation means) 5, and an appraisal part (condition change appraisal means) 6.

The data acquisition part 2 acquires data of a plurality of types of information pertaining to the condition of an image forming apparatus that serves as an electronic device. The data storing part 3 stores a reference data group made up of a plurality of sets of data of a plurality of types of information acquired about the image forming apparatus that serves as the subject for condition appraisal. The calculation equation determining part 4, based on the reference data group stored in the data storing part 3, determines an index value calculation equation for calculating the index value employed for the condition appraisal of the image forming apparatus. The index value calculation part 5 calculates a single index value based on the abovementioned index value calculation equation and the data of a plurality of types of information acquired about the image forming apparatus that serves as the subject for condition appraisal. The appraisal part 6, based on comparative results of the index value calculated by the index value calculation part 5 and a standard value established in advance, appraises the condition of the image forming apparatus that serves as the subject for condition appraisal. Subsequent changes in the condition of the image forming apparatus can be appraised on the basis of the data of changes over time of the index value calculated by the index value calculation part 5. The data of the changes over time of the index value calculated by the index value calculation part 5 and the data of the appraised result as appraised by the appraisal part 6 can be employed by a main controller 7 that serves as control means for controlling the devices in an image forming system 8 that serves as image forming means and output to display means such as a display or an external device.

The abovementioned data acquisition part 2, which acquires the later-described data of a plurality of types of information, is configured from a variety of sensors for detecting a variety of sensing information and a communication interface or the like for the transmission of data between the main controller 7 and an image data processor 9. The data acquisition part 2 sends a data acquisition request to the various sensors, to the main controller 7, and to the image data processor 9. The abovementioned main controller 7, which facilitates the receipt of various sensing information data from the various sensors, the receipt of control parameter information data from the main controller 7, and the receipt of information data input from the image data processor 9, comprises a CPU, RAM, ROM and I/O interface part and so on. The abovementioned data storing part 3 can comprise an electronic memory such as a RAM or ROM, and an external storing device or the like such as a magnetic disk (FD, HD) or optical disk.

The abovementioned calculation determining equation part 4, index value calculation part 5 and appraisal part 6 may be provided separately to the main controller 7 as a device configured from a specialist LSI or the like, or they may be configured to serve jointly for use as a hardware resource such as the CPU from which the abovementioned main controller 7 is configured. In addition, the abovementioned main controller 7 may serve jointly for use as the control means for controlling each part of the condition appraisal apparatus 1, or an independent control part may be provided.

Figure 2:
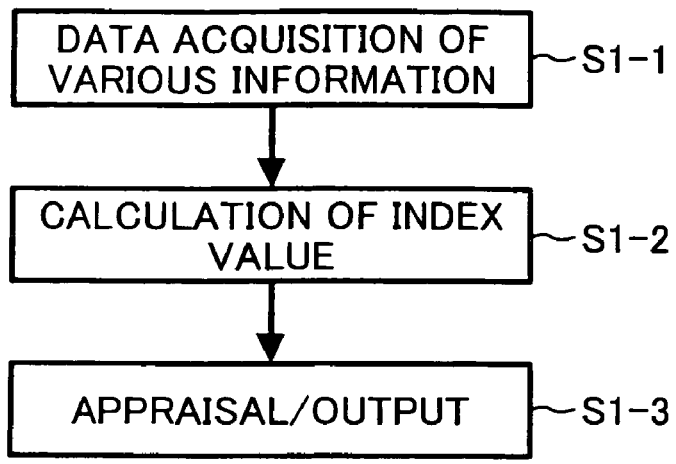
FIG. 2 is a flowchart illustrating the fundamental operation of the abnormality diagnosing system.

The information input into the index value calculation part by the acquisition of data by the abovementioned data acquisition part 2 is made up of, as shown in FIG. 2, sensing information (a), control parameter information (b), and input image information (c) and so on.

The abovementioned sensing information constitutes information obtained by various sensors provided in the interior or the periphery of the image forming apparatus. Examples of this sensing information include apparatus part dimensions, the speed of moving bodies in the apparatus, time (timing), weight, electric current value, potential, vibration, noise, magnetic force, light quantity, temperature and humidity.

The abovementioned control parameter information is generally comprises information accumulated as a device control result. Examples of control parameter information include operation history of the user, power consumption, amount of toner consumed, history of various set image forming conditions, and warning history.

The abovementioned input image information is obtained from information input into the image forming system 8 as image data. Examples of input image data include colored pixel cumulative number, character part percentage, half-tone part percentage, color character percentage, distribution of toner consumption in the scanning direction, RGB signal (total toner quantity per pixel unit), paper size, bordered paper, character type (size and font) and so on.

FIG. 2 is a flowchart illustrating the fundamental operation of the abnormality diagnosing system of the abovementioned constitution. A single set of data of the abovementioned plurality of types of information that is surmised to bear relation to the condition of the image forming apparatus that serves as the subject for appraisal is input into the condition appraisal apparatus 1 of the abnormality diagnosing system (Step 1-1). The data of the plurality of types of information is acquired at prescribed appraisal timings by the data acquisition part 2 and, using the index value calculation equation determined by a later-described method, the index value calculation part 5 calculates a single index value (Step 1-2). The data of changes over time of the calculated index value, which is employed for appraising the occurrence of abnormality such as breakdown of the image forming apparatus, is output to a display or to an external device (Step 1-3).

Figure 3:
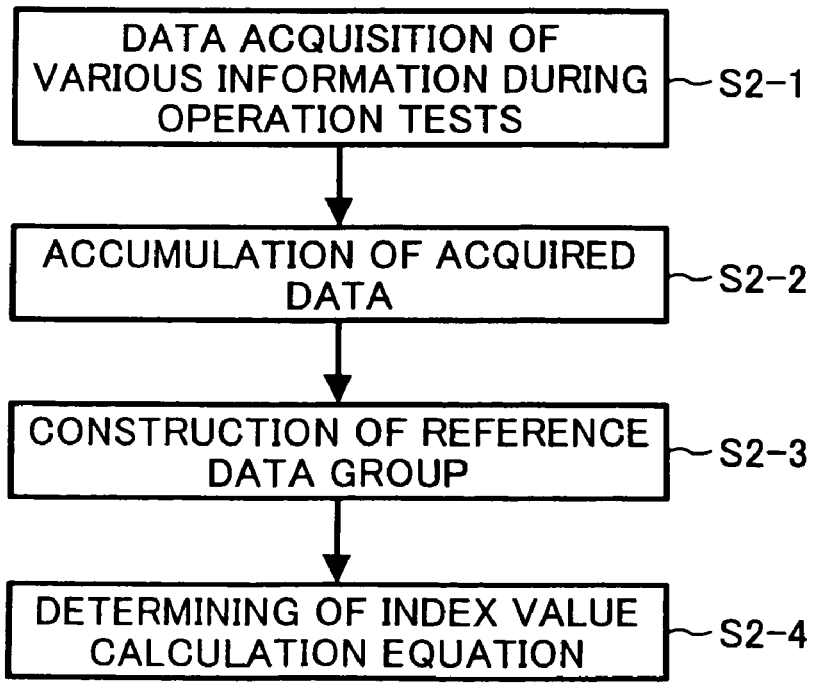
FIG. 3 is a flowchart schematically illustrating the routine for determining the index value calculation equation.

FIG. 3 is a flowchart schematically illustrating the routine for determining the index value calculation equation (calculation method) employed for the calculation of the abovementioned index value.

The index value calculation equation employed for the calculation of the index value thereof must be determined (calculation method) prior to the calculation of the index value of the image forming apparatus that serves as the abovementioned subject for appraisal. The present invention employs the MTS (Mahalanobis Taguchi System) method for condition appraisal which involves the defining of a multidimensional space in which coordinates that differ depending on the input plurality input information are set, and the calculation of the index value as the distance across this multidimensional space (Mahalanobis distance).

Thereupon, for the purpose of constructing the reference data group from which this multidimensional space is formed, data about a plurality of information the same as the information acquired in the condition appraisal of FIG. 1 is acquired by the data acquisition part 2 (Step 2-1). This data is acquired continuously and a plurality of times at prescribed timings following the manufacture of the image forming apparatus during operation tests conducted on an image forming apparatus that is operating normally. In addition, this data is acquired about a plurality of image forming apparatuses of the same type as the image forming apparatus that serves as the subject for appraisal. It is preferable that the plurality of image forming apparatuses about which this data is acquired is image forming apparatus of the same manufacturing lot.

The data acquired by the abovementioned data acquisition part 2 is accumulated in the data storing part 3 (Step 2-2). The reference data group employed for determining the index value calculation equation is constructed using the plurality of sets of data accumulated in the data storing part 3 (Step 2-3). The index value calculation equation is determined in accordance with the reference data group (Step 2-4).

Figure 4:
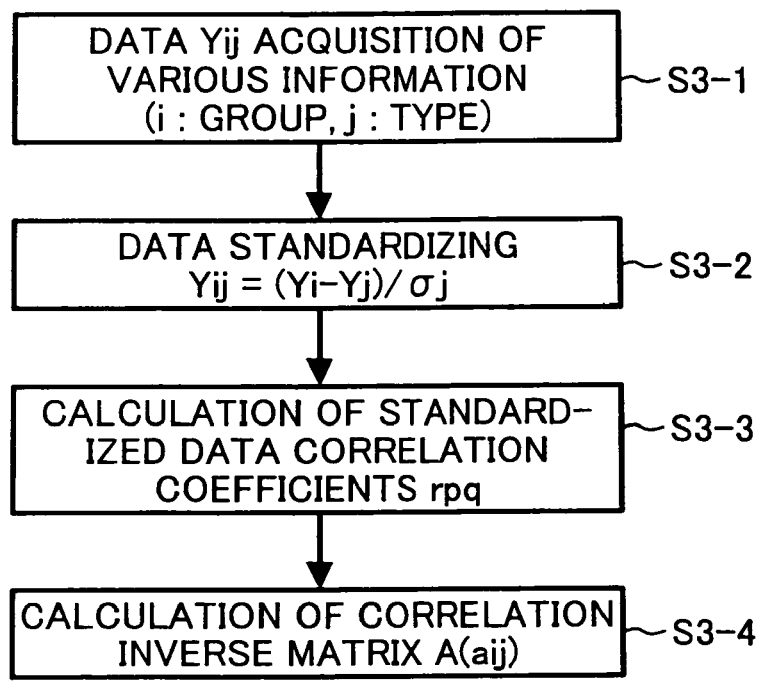
FIG. 4 is a flowchart illustrating more specifically the routine for the determining of the index value calculation equation employed for the calculation of the index value.

FIG. 4 is a flowchart illustrating more specifically the routine for the determining of the index value calculation equation employed for the calculation of the index value of the present invention.

First, while the image forming apparatus is operated, n sets of data of a k number of information types considered to bear relation to the condition of the image forming apparatus are acquired following manufacture during operation tests conducted to confirm the operation thereof (Step 3-1). This acquisition of information is as outlined above and a description of a specific example thereof will be given later.

FIG. 32 illustrates the make-up of the information data acquired about a plurality of image forming apparatuses during operation tests. A k number of data are obtained at an initial condition (for example, a first acquisition timing for a first device). These are taken as $y_{11}, y_{12}, \ldots, y_{1K}$). Data obtained in the same way at a next condition (for example, at a first acquisition timing for a second device) are taken as $y_{21}, y_{22}, \ldots, y_{2k}$. By the repetition of data acquisition in this way a reference data group (parent group of the reference data) configured as a whole from n sets of data is obtained. Here, the "k" of FIG. 32 refers to the total number of types of information targeted for acquisition, and "n" refers to the total number of acquired data groups.

Next, the data created (for example, $y_{ij}$) employing equation (1) shown in FIG. 34 for each information type (j) is standardized employing the average value $(y_j)$ and the standard deviation $(\sigma_j)$ (Step 3-2). FIG. 33 illustrates the results obtained by the standardizing of the data shown in FIG. 32 employing the equation shown by equation (1). Here, the "Yij" in the equation refers to the standardized data obtained by the standardizing of an $i^{th}$ group data $(Y_i)$ of created data acquired about a $j^{th}$ type of information. In addition, the "$y_j$" and "$\sigma_j$" refer to the calculated average value and standard deviation of data of the $j^{th}$ type of information respectively.

Next, employing equation (2) shown in FIG. 35, all correlation coefficients $r_{pq} (=r_{qp})$ between two groups of the k types of data are found and expressed as the matrix R as shown in equation (3) of FIG. 36 (Step 3-3). Furthermore, the inverse matrix of the correlation coefficient matrix R is found and the result thereof is expressed as the matrix A of equation (4) as shown in FIG. 37 (Step 2-4).

Based on the above, the values of the calculation parameters of the calculation equation employed for the calculation of the abovementioned single index value are determined. By virtue of the fact that the normal condition of all of the handled data groups is expressed here, fixed correlations are considered to exist between the various uptaken information. When departure from the normal condition occurs and it is apparent that an abnormality such as breakdown is imminent, a disruption to these correlations occurs and the "distance" from the origin (average of the stable condition) of the abovementioned defined multidimensional space increases. This "distance" constitutes the index value.

Figure 5:
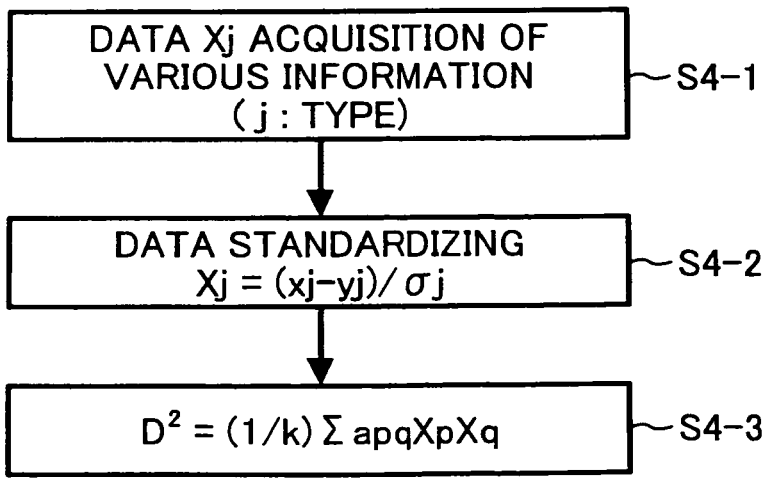
FIG. 5 is a flowchart illustrating more specifically the routine for the calculation of the index value.

FIG. 5 is a flowchart illustrating more specifically the routine for the calculation of the index value for the condition appraisal of the Step 1-2 of FIG. 2. First, k types of data $x_1, x_2, \ldots, x_k$ are acquired at prescribed timings (Step 4-1). These data types correspond to the abovementioned $y_{11}, y_{12}, \ldots, y_{1k}$. Next, employing equation (5) shown in FIG. 38, the acquired information data is standardized (Step 4-2). Here, the standardized data is taken as $x_1, x_2, \ldots, x_k$. Next, based on equation (6) shown in FIG. 39 determined by the employment of the already found element $a_{kk}$ of the inverse matrix A, the Mahalanobis distance $D^2$ is calculated as the index value. Instead of $D^2$, the square root value of D may also be used as the index value.

Based on the index value $D^2$ calculated as described above the latent possibility of abnormality such as breakdown is appraised and the occurrence of abnormality such as breakdown is predicted. Fundamentally, when the magnitude of the index value $D^2$ calculated from the plurality of types of information as described above is larger than a standard value (threshold value) established in advance the possibility that breakdown will occur is high. This threshold value is generally determined through prior testing otherwise, an initial value is established as a suitable value (for example 10) and is updated through data stacking.

In addition, the abovementioned index value $D^2$ expresses the deviation from the normal condition of the correlation between the pluralities of acquired information as a linear measure. By virtue of the fact that the larger the index value the larger the departure from the normal condition, the possibility of the occurrence of breakdown can be foreseen even if the mechanism of the breakdown is unclear.

Next, a description will be given of the reference data group (data parent group) update routine employed when determining the coefficients (yj, σj, $a_{pq}$) the multidimensional space, that is to say, of the abovementioned index value calculation equation employed for the calculation of the abovementioned index value $D^2$.

In the present invention, during operation tests conducted prior to the delivery of the image forming apparatus as described above, a plurality of sets of data of a plurality of types of information are acquired and an initial reference data group is constructed. In the state following completion of the operation tests and prior to delivery, the coefficients of the multidimensional space, that is to say, the abovementioned index value calculation equation (yj, σj, $a_{pq}$) that affords a highly reliable condition appraisal can be determined by the employment of the abovementioned initial reference data group. However, when an image forming apparatus is actually installed in a location and the utilization thereof by the user is initiated there are times when, irrespective of whether the condition of the device is normal, the abovementioned index value $D^2$ changes significantly and an abnormality is either diagnosed as having occurred or the occurrence thereof is forecast. The cause of this is thought to be, apart from the difference in environmental conditions such as the temperature and humidity between the location at which the operation tests are conducted and the location used by the user, the significant changes made to the setting of the image forming conditions by the operator at the time of delivery. Another abovementioned cause thereof is thought to be the usage mode bias of the user such as a bias towards the output of black and white character images or color images.

Thereupon, as is indicated next, it is preferable that data of a plurality of types of information about the image forming apparatus be acquired at prescribed update timings following the initiation of use of the image forming apparatus by the user, and that this data be added to the reference data group to update the reference data group.

Figure 6:
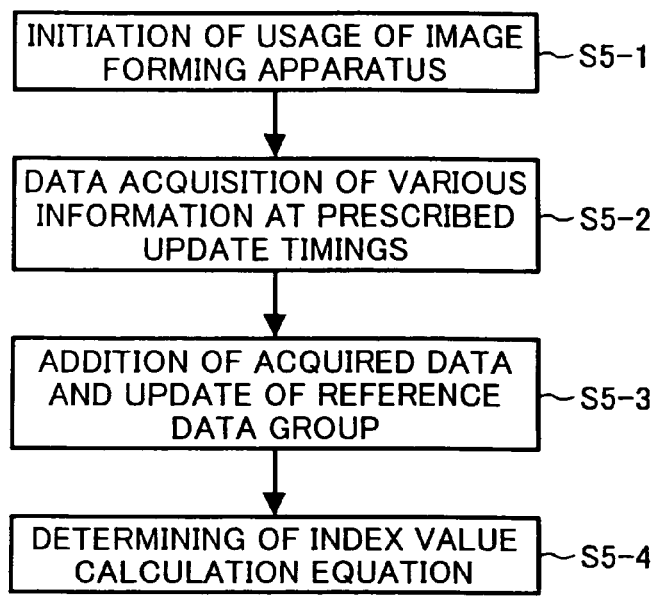
FIG. 6 is a flowchart illustrating one example of a reference data group update routine.

In the example of the update routine of FIG. 6, a range of information data the same as that used for the construction of the initial reference data group as described above is acquired at prescribed update timings following the initiation of the image forming apparatus by the user (Step 5-1, 5-2). The number of sets of data acquired here may be one or a plurality of groups of 2 or more. In this respect this is identical to the example of a later-described update routine.

Next, the acquired data is added to the reference data group stored in the data storing part 3 to update the reference data group (Step 5-3). Once this data is added old data previously stored in the data storing part 3, that is to say, old data acquired about the initial condition device that is significantly different from the existing device condition may be deleted. In this respect this is the same as the example of a later-described update routine.

Next, based on the abovementioned updated reference data group, the coefficients (yj, σj, $a_{pq}$) of the multidimensional space, that is to say, the abovementioned index value calculation equation employed for the calculation of the abovementioned index value $D^2$ are determined (Step 5-4).

It should be noted that the update timings of the abovementioned reference data group may be update timings that are established in advance to be implemented regularly at prescribed times or at prescribed number of days, or they may be update timings set to be implemented at the completion of the printing of a prescribed number of printed sheets. In this respect this is the same as the example of a later-described update routine.

Figure 7:
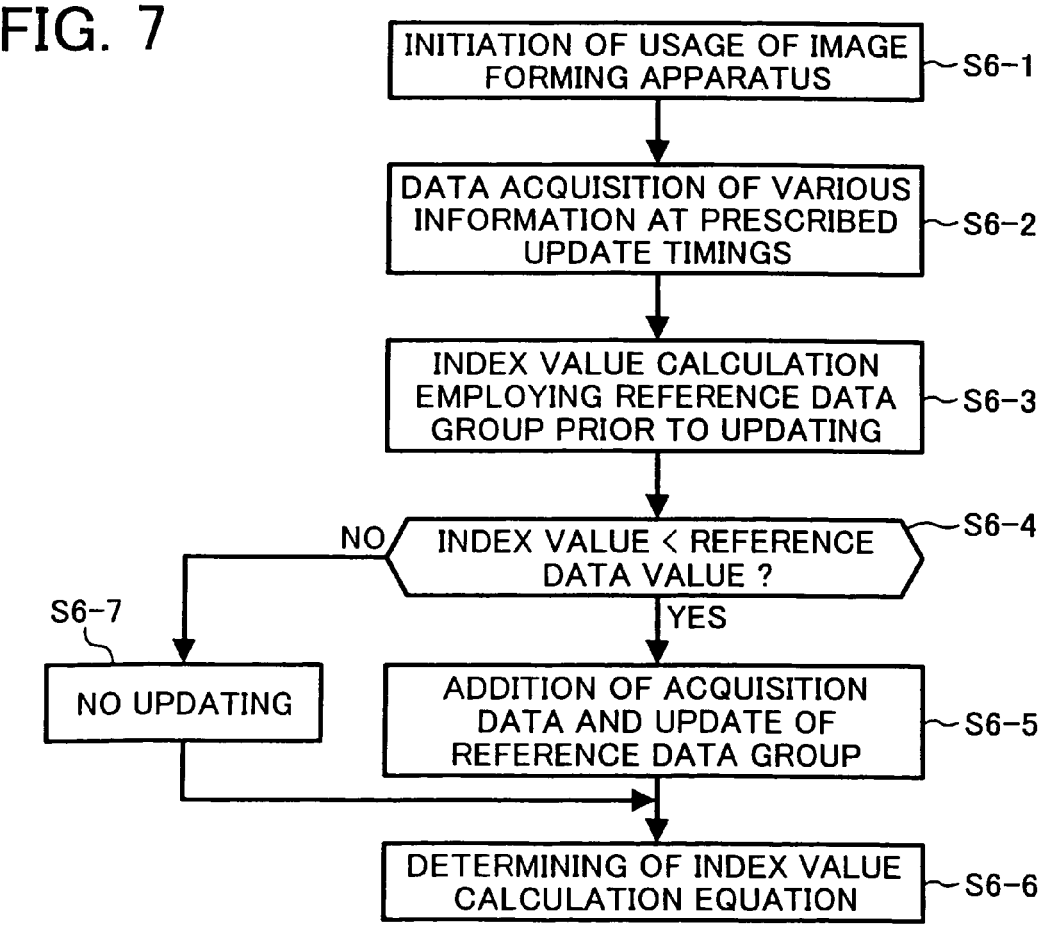
FIG. 7 is a flowchart illustrating the reference data group update routine pertaining to a modified example of the present invention.

In addition, in the example of the update routine of FIG. 7, data of the same variety of information is acquired at prescribed timings following the initiation of the image forming apparatus by the user (Step 6-1, 6-2). The index value $D^2$ is calculated on the basis of the acquired data and the index value calculation equation is determined on the basis of the reference data group prior to updating (Step 6-3). If the index value $D^2$ is within a prescribed range established in advance (in the example of FIG. 7, if it is smaller than a reference value established in advance), the acquired data is added to the reference data group stored in the data storing group 3 to update the reference data group (Steps 6-4, 6-5) On the other hand, if the index value $D^2$ calculated on the basis of the abovementioned reference data group prior to the updating is outside the prescribed range (in the example of FIG. 7, if it is greater than the reference value established in advance), the acquired data is not added to the reference data group and the reference data group is not updated (Step 6-7).

Figure 8:
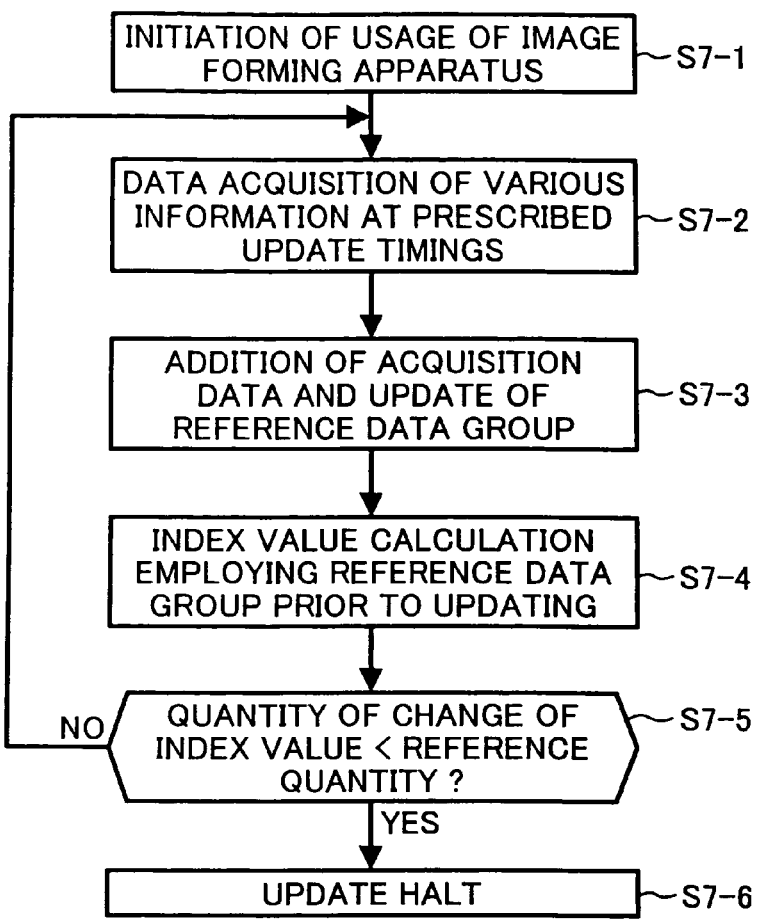
FIG. 8 is a flowchart illustrating a reference data group update routine pertaining to another modified example thereof.

In addition, in the example of the update routine of FIG. 8, data of the same variety of information is acquired at prescribed timings following the initiation of the image forming apparatus by the user (Step 7-1, 7-2). The acquired data is added to the reference data group stored in the data storing group 3 to update the reference data group (Step 7-3). The index value $D^2$ is calculated on the basis of the abovementioned newly acquired data and the index value calculation equation that has been determined employing the updated reference data group (Step 7-4). Here, if the quantity of change of the index value $D^2$ (for example, difference with a previous calculated index value) is within a range established in advance (in the example of FIG. 8, if it is smaller than a reference quantity established in advance), the updating of the reference data group is halted (Step 7-6). On the other hand, if the quantity of change of the abovementioned index value $D^2$ is outside a prescribed range (in the example of FIG. 7, if it is greater than a standard quantity established in advance), the updating of the reference data group is continued.

Figure 9:
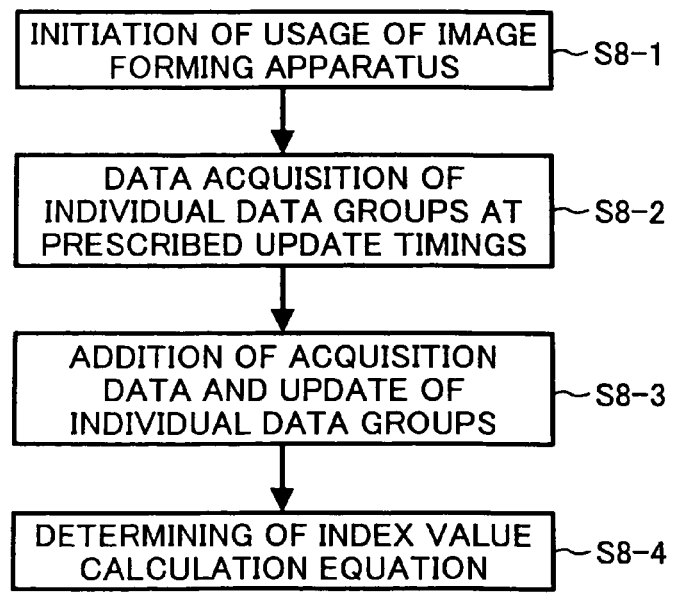
FIG. 9 is a flowchart illustrating a reference data group update routine pertaining to a further modified example thereof.

In addition, in the example of the update routine of FIG. 9, the abovementioned reference data group is separately controlled as individual data groups and shared data groups. The individual data groups are data groups of the abovementioned plurality of types of information that are made up of data acquired about information that is easily affected by the usage conditions by the user of the image forming apparatus. Examples of information contained in individual data groups include environmental condition information such as temperature and humidity, and information about the type of information that is mainly output (for example black and white character images or color images). On the other hand, the abovementioned shared data groups, which constitute the remaining data groups other than the individual data groups, are data groups made up of data acquired about information that is not affected easily by the usage conditions of the image forming apparatus.

In this update routine, as is shown in FIG. 9, data about the various information contained in the abovementioned individual data groups is acquired at prescribed update timings following the initiation of the image forming apparatus by the user (Steps 8-1, 8-2). Next, only data acquired about the individual data groups of the reference data groups stored in the data storing part 3 is added to update the individual data groups (Step 8-3). Next, based on the updated reference data group, the coefficients (yj, σi, $a_{pq}$) of the multidimensional space, that is to say, the abovementioned index value calculation equation employed for the calculation of the abovementioned index value $D^2$ are determined (Step 8-4).

It should be noted that the data that makes up the abovementioned shared data groups may be acquired at prescribed update timings for a plurality of other image forming apparatuses of a type the same as the image forming apparatus that serves as the abovementioned subject of the condition appraisal. The data that makes up the shared data groups may be acquired from the image forming apparatus by way of a communication line using a management apparatus in a monitoring center that performs the centralized control of abnormality diagnosis in a plurality of image forming apparatuses as described above. The image forming apparatuses may be provided in such a way that the data that makes up the abovementioned shared data groups obtained about a plurality of image forming apparatuses may be acquired in a batch from the management apparatus by way of a communication line.

In addition, the image forming apparatuses may be provided in such a way that the data of the abovementioned shared groups and the abovementioned individual data groups acquired about each of the plurality of image forming apparatuses of the same type are sent to the management apparatus from the image forming apparatuses by way of a communication line. The management apparatus accumulates individual data group data about each of the plurality of image forming apparatuses and accumulates shared data group data about all of the plurality of image forming apparatuses. The abovementioned index value calculation equations that correspond to the image forming apparatuses are determined on the basis of the individual data groups and the shared data groups, and the information (coefficients yj, σj, $a_{pq}$ of the index value calculation equation) for specifying the index value calculation equations may be sent from the management apparatus to the image forming apparatuses by way of a communication line.

Next, a description will be given of an example of the constitution of an image forming apparatus in which the present invention is able to have application, as well as the operation thereof.

Figure 10:
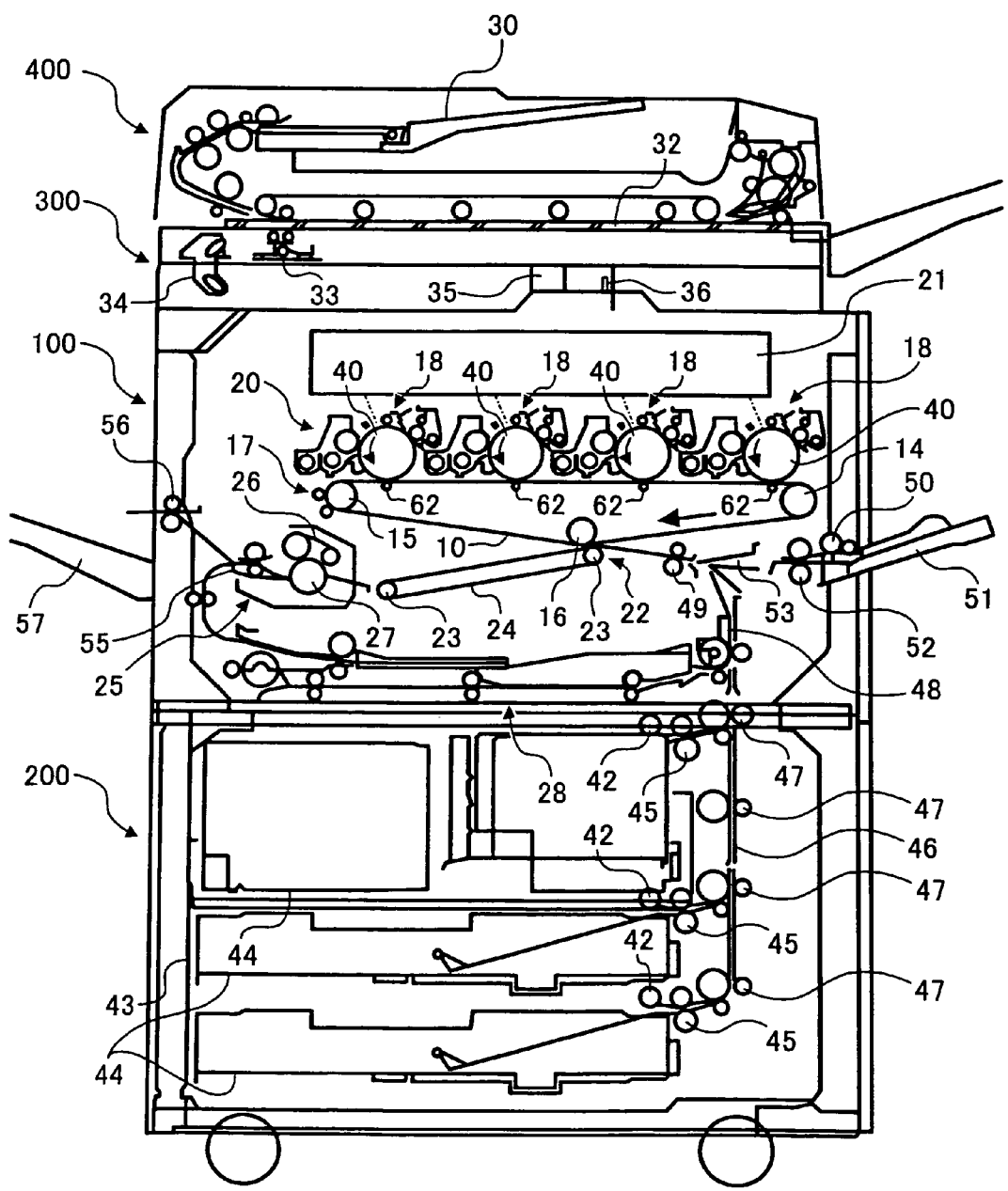
FIG. 10 is a block diagram of a color copier pertaining to the present invention.

FIG. 10 is a schematic diagram of a color copier that constitutes an image forming apparatus in which the electronic copier system pertaining to this present invention is employed. An image forming system 8, which serves as the image forming means of the color copier, comprises a printer part 100 that constitutes the copier main body, a paper feed part 200, a scanner part 300 and a paper carrier part 400. The scanner part 300 is attached to the copier main body 100, and the paper carrier part 400, which is configured from a copy paper automatic carrying device (ADF), is attached above the scanner part 300. In addition, the system comprises a main controller 7 (see FIG. 1) or an image data processor 9 that serves as control means for controlling the operation of each device within the color copier. The main controller 7, as is described above, comprises a CPU, RAM, ROM and an I/O interface and so on.

The scanner part 300 reads the image information of copy paper mounted on the contact glass 32 using a readout sensor 36 and sends the read image information to the main controller. The main controller, based on the image information received from the scanner part 300, controls a laser or LED or the like not shown in the diagram arranged in an exposure device 21 of the printer part 100 to irradiate a laser write light K on to light-sensitive drums 40Bk, 40Y, 40M, 40C. As a result of this irradiation an electrostatic latent image is formed in the surface of the light-sensitive drums 40Bk, 40Y, 40M, 40C, and this latent image is developed into a toner image by way of a prescribed developing process.

The printer part 100, in addition to the exposure device 21, comprises a primary transfer device 62, a secondary transfer device 22, a fixing device 25, a paper discharge device and a toner supply device not shown in the diagram. It should be noted that a description of the abovementioned developing process is given later.

The paper supply part 200 comprises a paper supply cassette 44 provided in a plurality of levels in a paper bank 43, paper supply rollers 42 for feeding out transfer paper P that serves as the recording medium from the paper supply cassette, separating rollers 45 for separating the fed transfer paper P and feeding it out to a paper supply path 46, and carrier rollers 47 for carrying the transfer paper P to a paper supply path 48 of the printer part 100. The apparatus of this present invention, in addition to the paper supply part, comprises a manual feed tray 51 in the side of the apparatus that allows for the manual insertion of the supply paper, and a separating roller for separating the transfer paper P on the manual insert tray into single sheets toward a manual insert paper supply path 53. Resist rollers 49 discharge a single sheet of the transfer paper P mounted in either the paper supply cassette 44 or the manual insert tray 51 and feed the sheet to a secondary transfer nip part located between an intermediate transfer belt 10 that serves as an intermediate transfer material and the secondary transfer device 22.

Using the abovementioned constitution, when a copy of a color image is to be made, the copy paper is either set on a copy paper base 30 of the copy paper carry part 400 or the copy paper carry part 400 is opened, the copy paper is set on the contact glass 32 of the scanner part 300, and the copy paper carry part 400 is closed to hold down the copy paper. When a start switch not shown in the diagram is pushed, while on the one hand, if the copy paper is set on the paper carrier part 400, the scanner part 300 is driven and a first moving body 33 and second moving body 34 are moved after the carry of the copy paper on to the contact glass 32, this occurs immediately if the copy paper is set on the contact glass 32. The light from a light source is emitted by the first moving body 33, and reflected light from the paper surface is further reflected toward the second moving body 34 and is then reflected by a mirror of the second moving body 34 to pass though an imaging lens 35 to a read sensor 36 where the image information is read. When the image information is received from the scanner part a laser write processing or a later-described development processing is implemented to form a toner image on the light-sensitive drums 40Bk, 40Y, 40M, 40C, and one of four resist rollers is operated to supply transfer paper P of a size that corresponds to the image information.

In addition, accompanying this, one of support rollers 14, 15, 16 are rotationally driven by a drive motor not shown in the diagram to produce the drive rotation of another two support rollers and to rotationally carry the intermediate transfer belt 10. Simultaneously, the light-sensitive drums 40Bk, 40Y, 40M, 40C are rotated by individual image forming units 18 to form single color images of black, yellow, magenta and cyan on the light-sensitive drums 40Bk, 40Y, 40M, 40C respectively. These single color images are transferred in sequence with the carry of the intermediate transfer belt 10 to form synthesized color images on the intermediate transfer belt 10.

Meanwhile, one of the supply rollers 42 of the paper supply part 200 is selectively rotated which feeds the transfer paper P from one of the paper supply cassettes 44 which is then separated into single sheets by the separating rollers 45 as it enters the paper supply path 46 and is then led by carry rollers 47 to a paper supply path 48 in the copier main body 100 where, following collision with the resist rollers 49, the transfer paper P is stopped. In addition, the paper supply rollers 50 are rotated to feed out the transfer paper P on the manual insert tray 51 which is then separated into single sheets by separating rollers 52 as it enters the manual supply path 53 whereupon, in the same way, following collision with the resist rollers 49, it is stopped. The resist rollers 49 are rotated at a coordinated timing with synthesized color images on the intermediate transfer belt 10, and the transfer paper P is fed into to the secondary transfer nip part that serves as an abutting part between the intermediate transfer belt and secondary transfer rollers 23 whereupon, due to the effect of the transfer electric field and abutting pressure and so on formed on the nip, a secondary transfer of the color image occurs resulting in the recording of the color images on the transfer paper P.

The transfer paper P on which image transfer has been completed is fed into the fixing device 25 by the carry belt 24 of the secondary transfer device and, following the fixing of the toner image by the imparting of heat and the pressure of pressurizing rollers 27 and in the fixing device 25, it is discharged to the discharge paper tray 57 by the discharge rollers 56.

Next, a detailed description will be given of the printer part 100 of the color copier of the present invention.

Figure 11:
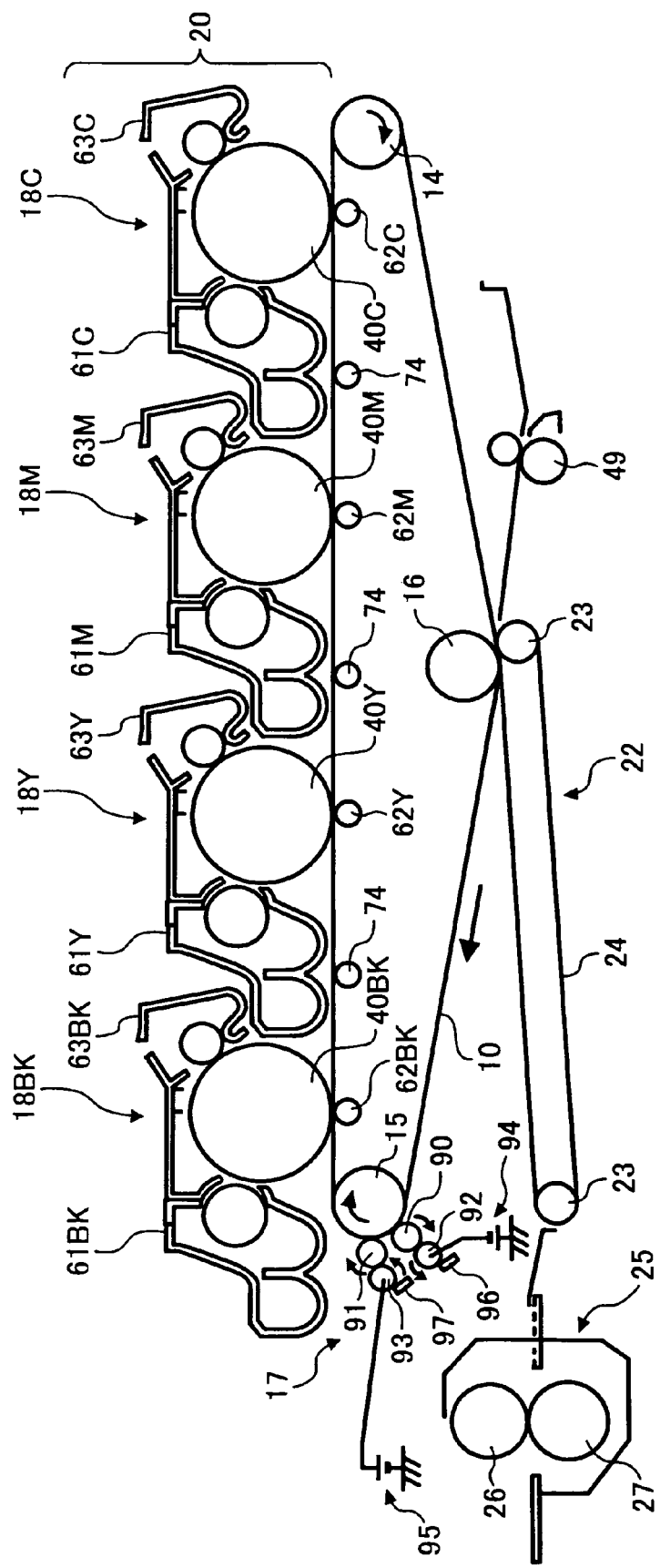
FIG. 11 is a main part expanded view of the printer part of said color copier.

FIG. 11 is a main part expanded view of the printer part 100. The printer part 100 comprises an intermediate transfer belt 10 indicated by three support rollers 14, 15, 16 that serve as an intermediate transfer belt and, four light-sensitive drums 40Bk, 40Y, 40M, 40C provided side-by-side opposing the intermediate transfer belt that serve as latent carriers on which each of the single color toner images of black, yellow, magenta and cyan are carried on the surface, and developing units 61Bk, 61Y, 61M, 61C that serve as developing means for forming toner images on the light-sensitive drum surfaces. It further comprises light-sensitive cleaning devices 63Bk, 63Y, 63M and 63C for removing residual toner following primary transfer from the light-sensitive drum surfaces. A tandem image forming apparatus 20 is configured from the four image forming units 18Bk, 18Y, 18M, 18C comprising the abovementioned light-sensitive drums 40Bk, 40Y, 40M, 40C, the developing units 18Bk, 18Y, 18M, 18C, and the light-sensitive cleaning devices 63Bk, 63Y, 63M and 63C. In addition, the device comprises, to the left of the support roller 15, a belt cleaning device 17 for removing the residual toner that remains on the intermediate transfer belt 10 following the transfer of toner images on to the transfer paper.

As a cleaning member, two fur brushes 90, 91 are provided in the cleaning device 17. The fur brushes 90, 91 employed, of φ20 mm, acryl carbon, 6.25 D/F, 100,000/inch$^2$ and 1×10$^7$ Ω, are provided in such a way as to contact the intermediate transfer belt 10 and rotate in the counter direction thereto. In addition, a different polarity bias is imparted from the power source not shown in the diagram to each of the fur brushes 90, 91. In addition, metal rollers 92, 93 are provided to contact each of the fur brushes 90, 91 and to be able to rotate in sequence with or in the inverse direction to the fur brushes.

In the present invention a (−) voltage is imparted from a power source 94 to the upstream side metal roller 92 in the direction of rotation of the intermediate transfer belt 10, and a (+) voltage is imparted from a power source 95 to the downstream side metal roller 93. The tip end of blades 96, 97 is pushed against the metal rollers 92, 93 respectively. The intermediate transfer belt 10 is rotated in the direction of the arrow and, initially employing the upstream side fur brush 90, the intermediate transfer belt 10 is cleaned by the imparting of, for example, a (−) bias. The imparting of −700V to the metal roller 92 produces −400V in the fur brush 90 which results in the transfer of the (+) toner on the intermediate transfer belt 10 to the fur brush 90 side. As a result of potential difference, toner transferred to the fur brush side is further transferred from the fur brush 90 to the metal roller 92 where it is then scraped off by the blade 96.

Although toner is removed from the intermediate transfer belt 10 by the fur brush 90 in this way, a large amount of toner still remains on the intermediate transfer belt 10. This toner is (−) charged due to the (−) bias imparted to the fur brush 90. This is regarded as being charged by charge injection or discharge. Subsequently, the toner can be scraped off by cleaning this time by the imparting of a (+) bias employing the downstream side fur brush 91. The removed toner is transferred from the fur brush 91 to the metal roller 93 due to the potential difference and is scraped off by the blade 97. The toner scraped off by the blades 96, 97 is collected in a tank not shown in the diagram. A later-described toner recycle device may be employed to return this toner to the developing apparatus 61.

Almost all of the toner on the intermediate transfer belt 10 surface is removed following cleaning by the fur brush 91 and only a small amount of toner still remains thereon. The toner remaining on the intermediate transfer belt 10 is (+) charged due to the (+) bias imparted to the fur brush 91 as described above. The (+) charged toner can be transferred to the light-sensitive drums 40Bk, 40Y, 40M, 40C by a transfer electric field imparted by the primary transfer device where it can then be collected by the light-sensitive cleaning device 63.

The secondary transfer device 22 is provided in the side opposing the tandem image forming apparatus 20 sandwiching the intermediate transfer belt 10. The secondary transfer device 22, which in the present invention is configured by the assembly of a secondary transfer belt 24 that spans between two rollers 23, is arranged to push against a third roller 16 by way of the intermediate transfer belt 10 whereupon, forming a secondary nip part, it affords the secondary transfer of color toner images on the intermediate transfer belt 10 on to the transfer paper. Following secondary transfer the intermediate transfer belt 10 is prepared again for image formation by the tandem image forming apparatus 20 by the removal of the residual toner remaining on the intermediate transfer belt 10 following image transfer by the belt cleaning device 17. The abovementioned secondary transfer device 22 is additionally provided with a transfer paper P carry function for carrying the transfer paper P following image transfer to the fixing device 25. Naturally, a transfer roller or a noncontact charger may be provided to serve as the secondary transfer device 22 although, in such cases, the joint provision thereof with the transfer paper P carry function is made more difficult.

Although in most usage cases the resist rollers 49 are generally earthed, they can also be used to impart a bias for the purpose of removing paper dust from the transfer paper P. By way of example, conducting rubber rollers may be used to impart a bias. The conducting rubber that is used is an NBR rubber of diameter φ8 mm and surface thickness 1 mm. The electrical resistance thereof, which is equivalent to the volume resistance of the rubber material, is of the order of 10×10$^9$ Ω·cm, and the voltage it imparts is a voltage of the order of −800V which is imparted to the side to which the toner is to be transferred (upper side) In addition, it imparts a voltage of the order of +200V to the reverse surface side of the paper.

Generally, because it is unlikely the movement of paper dust to a light-sensitive drum in an intermediate transfer system is unlikely there is little need to consider the movement of paper dust and, accordingly, the rollers may be earthed. In addition, although the imparted voltage is a DC bias voltage, with a view to more uniformly charging the transfer paper P this may be an AC voltage comprising a DC offset component. In this way, after passing through the resist rollers 49 to which the bias has been imparted, the surface of the paper is charged slightly to the minus side. Accordingly, in the transfer from the intermediate transfer belt 10 to the transfer paper P, compared to when there is no voltage imparted to the resist roller 49, there are times when the transfer conditions alter or the transfer conditions are changed.

It should be noted that, in the present invention, a transfer paper inversion device 28 for inverting a transfer paper P on which images are to be recorded on both surfaces of the transfer paper P (see FIG. 10) is provided in parallel with the tandem image forming apparatus 20 below the secondary transfer device 22 and the fixing device 25. As a result, following image fixing on one surface of the transfer paper P, the route of the transfer paper P may be switched to the transfer paper P inversion device side by a switching catch whereupon, following inversion and the transfer of another toner image using the support transfer nip, it is discharged to the paper discharge tray.

Next, a description will be given of the abovementioned tandem image forming apparatus 20.

Figure 12:
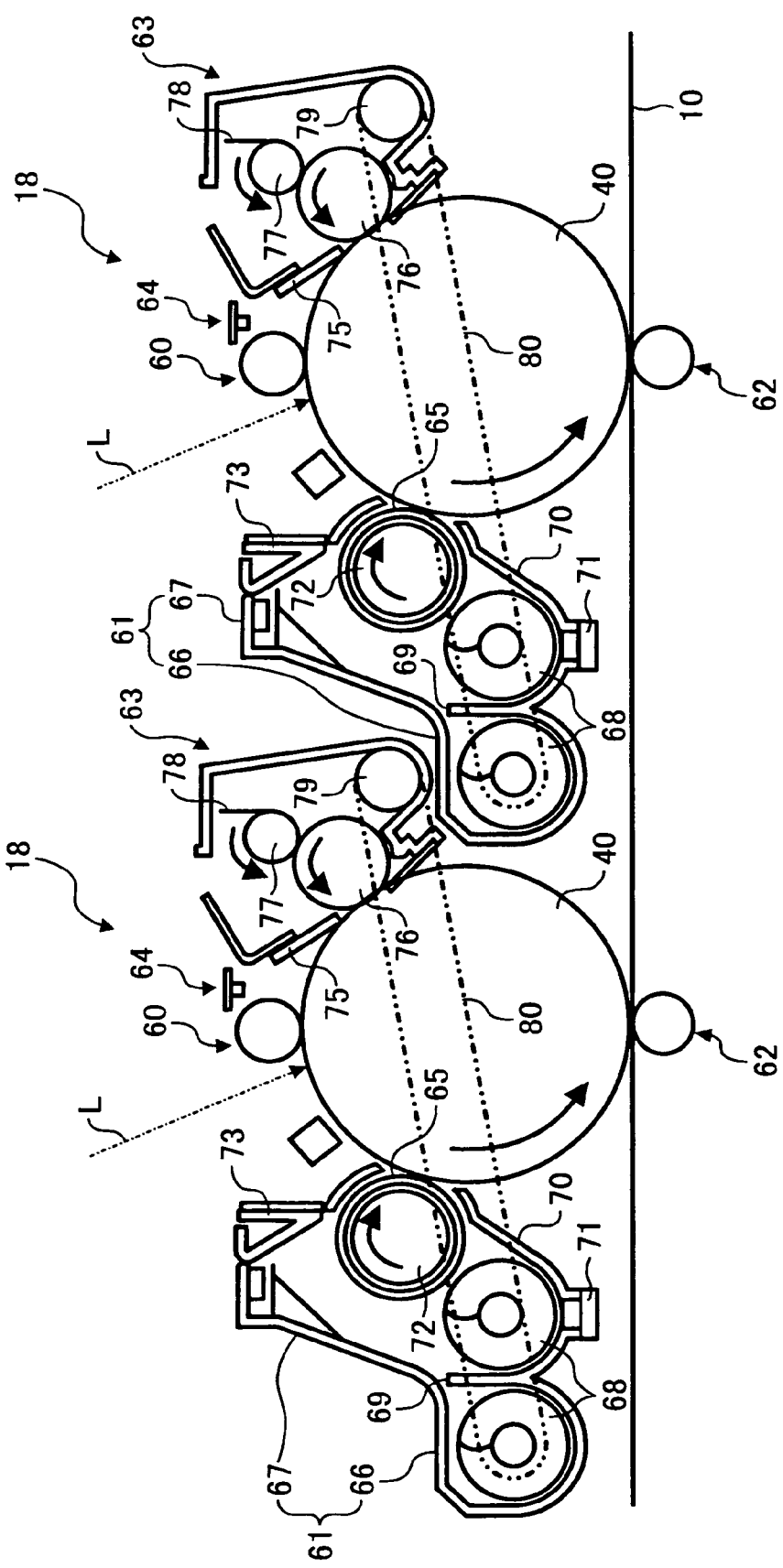
FIG. 12 is a partial expanded view of a tandem image forming apparatus of said printer part.

FIG. 12 is a partial expanded view of the tandem image forming apparatus 20. By virtue of the fact that the four image forming units 18Bk, 18Y, 18M, 18C comprise identical constitutions, the description given is of the constitution of one unit only and omits the four color reference symbols Bk, Y, M and C. As is shown in FIG. 12, the image forming units comprise, around the light-sensitive drums 40Bk, 40Y, 40M, 40C, a charge device 60 that serves as charging means, a developing apparatus 61, a primary transfer device 62 that serves as primary transfer means, a light-sensitive cleaning device 63, and a charge removal device 64 and so on. Although, in the example shown in the diagrams, the abovementioned light-sensitive drums 40Bk, 40Y, 40M, 40C are a drum shape in which a light-sensitive layer is formed thereon by the coating of a light-sensitive organic light-sensitive material on an aluminum tube or the like, they may also be of a continuous belt shape.

In addition, although omitted from the diagrams, a processor cartridge may be provided that forms part or all of the section that makes up the image forming units 18 and comprises at least, the light-sensitive drums 40Bk, 40Y, 40M, 40C and, in that this allows for the block detachment thereof from the copier main body 100, this improves maintainability. In addition, in the section configured from the image forming units 18, by the contact with and imparting of a voltage to the light-sensitive drums 40Bk, 40Y, 40M, 40C by the charging device 60 which, in this example, is formed in a roller shape, said light-sensitive drums 40Bk, 40Y, 40M, 40C are charged. Naturally, this charging can be implemented using a noncontact scorotron charger.

Although a single component developing agent may be used in the developing apparatus 61, a two component developing agent comprising a magnetic carrier and a non-magnetic carrier is used in the example shown in the diagram. An agitating part 66 that, while agitating and carrying the two component developing agent, supplies the two component developing agent for attachment to the developing sleeve 65, and a developing part 67 that transfers the toner of the two component developing agent attached to the developing sleeve 65 to the light-sensitive drums 40Bk, 40Y, 40M, 40C are provided, and the agitating part 66 is provided in a position lower than the developing part 67. Two parallel screws 68 are provided in the agitating part 66, and these two screws 68, excluding the two end parts, are partitioned using a partition plate 69. In addition, a toner density sensor 71 is provided in a developing case 70. A developing sleeve 65 is provided opposing the light-sensitive drums 40Bk, 40Y, 40M, 40C passing through the opening of the developing case 70 in the developing part 67, and magnets 72 are fixed to the developing sleeve 65. In addition, a doctor blade 73 is provided so that the tip end thereof is in close proximity of the developing sleeve 65. In the example shown in the diagrams, the interval between the closest part of the doctor sleeve 73 and the developing sleeve 65 is set at 500 μm.

The developing sleeve 65 is a non-magnetic rotatable sleeve shape, and a plurality of magnets 72 are arranged in the interior thereof. Because the magnets 72 are fixed they create a magnetic force when the developing liquid agent passes through a prescribed location. In the example shown in the diagram, the diameter of the developing sleeve 65 is φ18 mm, and the surface thereof is sandblasted or processed in such a way as to form a plurality of grooves of depth l to several mm and to form a surface coarseness (Rz) within a range of 10 to 30 μm.

The magnets 72 comprise, for example, 5 magnetic poles N1, S1, N2, S2 and S3 from the location of the doctor sleeve 73 in the direction of rotation of the developing sleeve 65. The developing agent is carried on the developing sleeve 65 in which a magnetic brush is formed from the magnets 72. The developing sleeve 65 is arranged opposing the light-sensitive drums 40Bk, 40Y, 40M, 40C in the region of the S1 side of the magnets 72 from which the magnetic brush for the developing liquid is formed.

Based on the abovementioned constitution, the two component developing agent is circulatory carried and supplied to the developing sleeve 65 while agitated by the two screws 68. The developing agent supplied to the developing sleeve 65 is drawn up and held by the magnets 72 that form a magnetic brush in the developing sleeve 65. The magnetic brush, together with the rotation of the developing sleeve 65, is cut by an appropriate amount by the doctor blade 73. The developing agent cut off is returned to the agitating part 66.

The toner of the developing agent carried on the developing sleeve 65 is transferred to the light-sensitive drums 40Bk, 40Y, 40M, 40C by the developing bias voltage imparted to the developing sleeve 65, whereupon electrostatic latent images are formed as visual images on the light-sensitive drums 40Bk, 40Y, 40M, 40C. Following the formation of the visual images, the developing agent remaining on the developing sleeve 65 separates from the developing sleeve 65 to be returned to the agitating part 66 at the point there is no magnetic force of the magnets 72. When the toner density within the agitating part 66 drops as a result of the repetition thereof this is detected by a toner sensor 71 and the agitating part 66 is replenished with toner.

It should be noted that the developing process implemented in the apparatus of the present invention involves the setting of the line speed of the light-sensitive drums 40Bk, 40Y, 40M, 40C to 200 mm/s and the line speed of the developing sleeve 65 to 240 mm/s, and the setting of the diameter of the light-sensitive drums 40Bk, 40Y, 40M, 40C to 50 mm and the diameter of the developing sleeve 65 to 18 mm. It is preferable that the charged quantity of toner on the developing sleeve 65 be in the range −10 to −30 μC/G. As in the prior art, the developing gap GP which exists as the gap between the light-sensitive drums 40Bk, 40Y, 40M, 40C and the developing sleeve 65 can be set in a range from 0.8 mm to 0.4 mm, and improvements in developing efficiency are afforded by reductions in this value. Furthermore, the thickness of the light-sensitive material 40 used is 30 μm, the beam spot diameter of the optical system used is 50×60 μm, and the light quantity used is 0.47 mW. In addition, the developing process is implemented using a charge (prior to exposure) potential V0 of the light-sensitive drum 40 of −700V and using an potential VL following exposure of −120V which produces a developing bias voltage of −470V, that is to say, a developing potential of 350V.

The primary transfer device 62, which is configured from roller-shaped primary transfer rollers 62, is provided to push against the light-sensitive drum 40 sandwiching the intermediate transfer belt 10. Tt should be noted that conducting rollers 74 are provided between the primary transfer rollers 62 to contact a base layer side 11 of the intermediate transfer belt 10. The bias of these conducting rollers 74 prevents the bias imparted by the primary transfer rollers 62 during transfer from flowing into adjacent image forming units 18 by way of the base layer 11 of medium resistance.

The light-sensitive cleaning device 63 employs a cleaning blade 75 made of, for example, polyurethane, of which the tip end thereof pushes against the light-sensitive drum 40. For the purpose of further enhancing the cleaning characteristics, a contact conductive fur brush 76 of which the outer perimeter contacts the light-sensitive drum 40 is provided in the present invention to be able to rotate in the direction of the arrow. In addition, a metal electric field roller 77 that imparts a bias to the fur brush 76 is provided to be able to rotate in the direction of the arrow, and the tip end of a scraper 78 abuts against the electric field roller 77. Furthermore, a collecting screw 79 for collecting the removed toner is also provided.

Using the light-sensitive cleaning device 63 of the abovementioned constitution, the fur brush 76 that rotates in the direction counter to the light-sensitive drum 40 removes the residual toner on the light-sensitive drum 40. The toner attached to the fur brush 76 is removed by the electric field roller 77 to which a bias has been imparted and which contacts the fur brush 76 and rotation in the counter direction thereto. The scraper 78 cleans the toner attached to the electric field roller 77. The toner collected by the light-sensitive cleaning device 63 is accumulated at one side of the light-sensitive cleaning device 63 by the collection screw 79 and is returned to the developing apparatus 61 for re-use by the toner recycle device 80.

A charge removal device 64, which employs a charge removal lamp, irradiates a light that initializes the surface potential of the light-sensitive drum 40.

The image forming process in the tandem image forming apparatus 20 of the abovementioned constitution is implemented as follows. Together with the rotation of the light-sensitive drum 40, first, the charging device 60 charges the surface of the light-sensitive drum 40 uniformly, and a write light L is irradiated on the light-sensitive drum 40 to form an electrostatic latent image. After this, development in which the toner is attached to the electrostatic latent image by the developing apparatus 61 is implemented to form a toner image, and a primary transference of this toner image on to the intermediate transfer belt 10 by the primary transfer roller 62 is performed. The residual toner on the surface of the light-sensitive drum 40 following image transfer is removed by the light-sensitive cleaning device 63 and, by way of preparation for the subsequent image formation, the charge is then removed by the charge removal device 64. Meanwhile, the residual toner removed from the light-sensitive drum surface by the toner recycle device is used again for development. Here, there are no particular limitations to the order in which the colors for forming the image are used and this will differ in accordance with the aims and the characteristics of the image forming apparatus.

Next, a specific description will be given of the type of information acquired for predicting the occurrence of abnormality in a color copier of the abovementioned constitution and the method for the acquisition of this information data.

(a) Regarding Sensing Information

Examples of sensing information regarded as subjects for acquisition include drive-related information, various characteristics of the recording medium, developing agent characteristics, light-sensitive characteristics, various process states of the electronic copier, environmental conditions, and various characteristics of the recording material. A summary of this sensing information is given in the description below.

(a-1) Drive Information

The rotational speed of the light-sensitive drum is detected by an encoder, the current value of the drive motor is read out, and the temperature of the drive motor is read out.

Similarly, the drive state of the cylinder-shaped or belt-shaped rotating component parts such as the fixing roller, paper carrier roller and drive rollers is detected.

A microphone arranged in the interior or exterior of the device detects the noise generated as a result of the drive.

(a-2) Paper Carry State

The position of the tip end or rear end of the carried paper is read, the generation of paper jam is detected, and deviation from the pass timing of the tip end and rear end of the paper and fluctuations in the direction perpendicular to the direction of feed are read using transmission-type or reflection-type optical sensors or contact-type sensors.

Similarly, the movement speed of the paper is found from detected timings between a plurality of sensors.

Slip between the paper supply rollers and paper when paper is supplied is found by comparison between the measured value of the rotational speed of the rollers and the quantity of paper that has been moved.

(a-3) Various Characteristics of Recording Medium Such as Paper

This information significantly influences the image quality and the stability of the carried sheet. The following methods are available for paper type information acquisition.

The thickness of the paper is found by the clasping of the paper by two rollers, the detection of the relative positional displacement of the rollers using an optical sensor, and the detection of a displacement amount that equivalent to the movement amount of a member pushed up as a result of the introduction of the paper.

For surface coarseness of the paper, a guide or the like is brought into contact with the surface of the paper prior to transfer and the vibration and slide noise and so on generated as a result of this contact is detected.

For paper gloss, a beam of light of a regulated opening angle at a prescribed incident angle is caused to fall incident and the beam of light of a regulated opening angle that is reflected in the direction of specular reflection is measured using a sensor.

Paper rigidity is found by the detection of the deformation amount (curvature amount) of the push-pressured paper.

For the judgment as to whether the paper is recycled paper or not, UV light is irradiated on to the paper and the transmittance thereof is detected.

For the judgment as to whether the paper is be lined paper or not light from a linear light source such as an LED array is irradiated and the light reflected from the transfer surface is detected by a solid-state filming element such as a CCD.

For the judgment as to whether the sheet is an OHP sheet or not light is irradiated on to the blank and specular reflection of different angle to the transmitted light is detected.

Moisture quantity contained in the paper is found by measurement of infrared light or µ-wave light absorption.

Curl amount is detected using an optical sensor or contact sensor.

Electrical resistance of the paper is measured directly by bringing a pair of electrodes (paper supply rollers or the like) into contact with the recording paper or by measurement of the surface potential of the light-sensitive or the intermediate transfer material following image transfer and estimation of the resistance value of the recording paper from this value.

(a-4) Developing Agent Characteristics

The characteristics of the developing agent (toner carrier) in the device affect the basic function of the electronic copier process. Accordingly, they are an important factor in terms of the operation and output of the system. The acquisition of developing agent information is extremely important. The following items represent examples of developing agent characteristics.

Examples of toner information include charge quantity and distribution thereof, fluidity—cohesion—bulk density, electrical resistance, external additive amounts, consumed amount or residual amount, fluidity, toner density (mixed ratio of toner and carrier).

Examples of carrier information include magnetic characteristics, coater film thickness, consumed quantity and so on.

The independent detection of the following items in an image forming apparatus is normally difficult. Accordingly, they are detected as collective characteristics of the developing agent. The collective characteristics of the developing agent can be measured in the following way.

The formation of a latent image for testing on the light-sensitive material, and development at development conditions established in advance to measure the reflection density (light reflection ratio) of the formed toner image.

The provision of a pair of electrodes in the developing apparatus and measurement of the relationship between imparted voltage and electric current flow (resistance and induction rate and so on).

The provision of a coil in the developing apparatus and measurement of the voltage-current flow characteristics (impedance).

The provision of a level sensor in the developing apparatus to detect the volume of developing agent. The level sensor may be of an optical type or an electrostatic capacity type.

(a-5) Light-Sensitive Characteristics

Similarly to the developing agent characteristics, light-sensitive characteristics are closely linked to the function of the electronic copier process. Examples of light-sensitive characteristic information include the film thickness of the light-sensitive material, surface characteristics (friction coefficient, unevenness), surface potential (prior to and following each process), surface energy, scattered light, temperature, color, surface position (deflection), line speed, potential attenuation speed, resistance·electrostatic volume, and surface moisture amount. Of these, the following information can be detected within the image forming apparatus.

Film thickness which is found by the detection of changes in electrostatic capacity accompanying changes in the film thickness and detection of the current flow flowing from the charge member to the light-sensitive material and, simultaneously, the comparison of the voltage imparted to the charge member and the voltage-current flow characteristics with respect to the dielectric thickness of the light-sensitive material established in advance.

Surface potential and temperature can be found using any well-known sensor of the prior art.

Line speed can be detected using an encoder affixed to the rotating axis of the light-sensitive material.

Scattered light from the light-sensitive material surface can be detected using an optical sensor.

(a-6) Electronic Copier Process State

As is well known, toner image formation based on an electronic copier system is implemented in a sequence of the uniform charging of a light-sensitive material, the formation of a latent image by a laser light or the like (image exposure), development using an electric charge toner (colored particles), transfer of a toner image to a transfer material (for a colored image the overlapping on an intermediate transfer material or a recording medium that serves as the final transfer material, or overlapped development on the light-sensitive material at the time of development), and the fixing of the toner image to the recording medium. The various information pertaining to these steps has a significant affect on the output of the image and other systems. The acquisition thereof is essential in terms of appraising the stability of the system. Specific examples of information acquired about the electronic copier process state include the following:

Detection of charge potential and exposure part potential using a known surface potential sensor of the prior art.

Detection of the gap between the charge member and the light-sensitive member in non-contact charging by measurement of the quantity of light passing through the gap.

Electromagnetic waves caused by charging that are trapped using a wide range antenna.

Noise generated by charging

Exposure strength

Exposure light wavelength

In addition, examples of methods for the acquisition of various states of the toner image include the following.

Finding of pile height (toner image height) based on a measurement of depth from the vertical direction using a displacement sensor and measurement of light-shielding length from the horizontal direction using a parallel beam linear sensor.

Finding of toner charge quantity based on measurement using a potential sensor that measures the potential of the solid print part electrostatic latent image and the potential in the state in which said latent image has developed, and comparison of the ratio thereof with the attached quantity as converted from a reflection density sensor mounted in the same location.

Finding of dot fluctuation and scatter based on detection of the dot pattern image using an infrared area sensor on the light-sensitive material and a wavelength area sensor correspondent to each color on the intermediate transfer material, and the appropriate processing thereof.

Finding of the offset amount (after fixing) based on reading of locations correspondent to the recording paper and fixing rollers by optical sensors and comparing the two.

Arrangement of optical sensors following the step of transfer (on the PD, on the belt) and ascertaining of the transfer residual amount using the quantity of light reflected light from the transfer patterns following the transfer of a specific pattern.

Detection of overlapping color ununiformity using a full-color sensor for the detection of said on the recording paper following fixing.

(a-7) Characteristics of a Formed Toner Image

Image density and color are optically detected (Possible using both reflected light and transmitted light. Transmitted wavelength is selected in accordance with color). Although the use of a light-sensitive material or an intermediate transfer material is suitable for the obtaining of density and individual color information, measurement of color ununiformity and combinations of color must be performed using paper.

For gradient characteristics, the reflection density of the toner image formed on the light-sensitive material or the toner image transferred to the transfer material are detected at each gradient level using an optical sensor.

Clarity is found by the read-out of images on which a line-repeating pattern has been developed or transferred using a single lens sensor of small spot diameter or a line sensor of high resolution.

Graininess (glare) is found using the same method as employed for the detection of clarity and involves the read-out of halftone images and calculation of the noise component.

Resistor skew is found by the provision of optical sensors to the rear of the resistor in both ends in the main scanning direction and is based on the difference between the resistor roller ON timing and the detected timing of both sensors.

For color shift, the edge parts of overlapped images on the recording medium or intermediate transfer material are detected using either a single lens small diameter spot sensor or a high resolution line sensor.

For banding (density ununiformity in the feed direction), the density ununiformity on the recording paper in the sub-scanning direction is measured using a small diameter spot sensor or high resolution sensor, and the signal quantity of a specific frequency is measured.

For glossiness (ununiformity), the recording paper on which a uniform image has been formed is detected by a specular reflection-type optical sensor.

For fog, a method that involves the reading the image background part using an optical sensor for detecting regions of a comparatively broad range on a light-sensitive material, intermediate transfer material or recording paper, or a method that involves the acquisition of image information for each background part area using a high resolution area sensor and counting the toner particle number contained in said image is used.

(a-8) Physical Characteristics of the Print Material Used in the Image Forming Apparatus For image flow and overlap and the like, the toner image on the light-sensitive material, intermediate transfer material or recording paper is detected using an area sensor and the acquired image information is ascertained by image processing.

Scatter is found by the uploading of the image on the recording paper using a high resolution line sensor or area sensor and the calculation of the toner quantity scattered in the region of the pattern part.

Rear end white speck and white speck close to the solid print part are detected using a high resolution line sensor on the light-sensitive material, intermediate transfer material or recording paper.

Curl—wave—bend are detected using displacement sensors. For bend detection it is effective for sensors to be arranged in locations close to both end sections of the recording paper.

For soiling and scratching of the edge face, using an area sensor vertically provided in the discharge paper tray, the edge face is filmed and analyzed by the area sensor at times when there something of a build-up of discharge paper occurs.

(a-9) Environmental Conditions

For temperature detection, in a thermoelement method in which the thermoelectromotive force generated at a contact point where different metals or metals and semiconductors are coupled is uptaken as a signal, a resistivity change element that utilizes the changes in the resistivity of metals or semiconductors caused by temperature, a collector-type element in which bias is produced in the charge arrangement within a crystal and potential is generated in the surface due to the rise in temperature of certain crystals, or a thermomagnetic effect element for detecting change in magnetic characteristics caused by temperature can be adopted.

For humidity detection, the use of an optical measurement method for detecting the $H_2O$ or the OH group light absorption, and a humidity sensor for measuring the changes in electric resistance value of a material caused by adsorption of water vapor are available.

For the various gases, accompanying the adsorption of the gases, the changes in the electrical resistance of an oxide semiconductor is measured.

Although an optical measurement method is available for the detection of gas flow (direction, flow speed, gas type), with consideration to the mounting thereof in the system an air-bridge-type processor is particularly effective because it can be more compacted.

For the detection of atmospheric pressure and pressure, a method in which the mechanical displacement of a membrane is measured using a pressure-sensitive material is available, and this same method is employed for the detection of vibration.

(b) Regarding Control Parameter Information

Because a main controller determines the operation of the image forming apparatus, the direct utilization of the input/output parameters of the main controller is found to be effective.

(b-1) Image Forming Parameters

Examples of direct parameters output by the calculation processing of the main controller for the purpose of image formation are given below.

The use of set values for the process conditions produced by the main controller, by way of example, charge potential, image bias value, and fixing temperature set values.

Similarly, the use of set values for various image processing parameters such as halftone processing and color correction and so on.

The use of various set parameters for the operation of the apparatus by the main controller such as, by way of example, the timing of the paper carry and the implementation time of the preparation mode prior to image formation and so on.

(b-2) User Operation History

Frequency of various operations selected by the user including number of colors, number of pages and image instructions and so on, Frequency of paper size selected by user (b-3) Power Consumption Total power consumption or the distribution, changes in amount (differential) and cumulative value (integral) thereof for a total time period or a specific time unit (1 day, 1 week, 1 month and so on)

(b-4) Consumption of Consumables Information

Usage amount of toner, light-sensitive material or paper or the distribution, changes in amount (differential) and cumulative value (integral) thereof for a total time period or specific time unit (1 day, 1 week, 1 month and so on)

(b-5) Breakdown Generation Information

Frequency of breakdown (by type) or the distribution, changes in amount (differential) and cumulative value (integral) thereof for a total time period or specific time unit (1 day, 1 week, 1 month and so on)

(c) Input Image Information

The following information can be acquired from image information sent as direct data from a host computer or from image information obtained following reading by a scanner of a copy paper image.

Color pixel cumulative number is found by the counting of the pixels for each of the image data of the GRB signals.

Based on a method described in, by way of example, Japanese Patent No. 2621879, the original image can be separated into characters—network points—photographs background and the ratio of character parts and halftone parts and so on can be obtained. In the same way, the ratio of color characters can be found.

Toner consumption distribution in the main scanning direction is obtained by the counting of the cumulative value of colored pixels by demarcated regions in the main scanning direction.

Image size is found from the image size signal generated by the main controller or the distribution of the color pixels in the image data.

Character type (size, font) is found from the attribute data of the characters.

Next, a description will be given of the method of processing that follows the calculation of the index value $D^2$ based on the abovementioned data of a plurality of types of information and the prediction of the occurrence of abnormality by appraisal of the condition of the image forming apparatus based on this index value $D^2$. The process as described in the following steps (d) to (j) can be implemented following the calculation of the index value or following the prediction of the occurrence of abnormality (d) Output of Calculation Results, Condition Appraisal Results and the Predicted Occurrence of Abnormality Results Examples of output content include the calculation result of the index value $D^2$ or a numeral in which this index value is reflected, an appraisal result of the changes in the condition of the image forming apparatus, and a prediction result of the occurrence of abnormality such as a warning of breakdown or of the end-life of a component part that informs the user that breakdown is imminent. The value of the index value $D^2$ or the data of changes over time of the numeral in which this is reflected may be output as a graph. Examples of this method of output include the following:

(d-1) Display of Numeric Data or Messages on Display Means Such as a Liquid Crystal Display in an Operation Panel Part or the Like.

(d-2) Warning or Notification Consisting of a Noise or a Specific Pattern Sound Produced by Output Noise Means Such as a Speaker.

(d-3) Recording on a Recording Medium (Transfer Paper).

The output results of the abovementioned (d) are output to display means or noise output means provided in the relevant image forming apparatus and are recorded and output on a recording medium (transfer paper). Separately thereto, a method based on communication means for transmitting these results to a printer server connected by way of a network or to a monitoring center for the monitoring of the condition of each device connected by way of a communication line may also be used.

(e) Transmission of Calculation Results, Condition Appraisal Results and Predicted Occurrence of Abnormality Results Contents identical to those of the abovementioned (d) are transmitted to a printer server or a monitoring center (f) Storing of Calculation Results, Condition Appraisal Results and Occurrence of Abnormality Prediction Results Contents the same as those of the abovementioned (d) are stored in a storing device (memory) provided in the interior of the image forming apparatus, a printer server, and devices in the monitoring center. Furthermore, the contents stored in these storing devices can be read out and controlled.

(g) Halting of the Devices

When a reference value of the calculation result of the index value $D^2$ established in advance is exceeded and the ratio of increase thereof is increasing, maintenance of the image forming apparatus is required to ensure the prevention of the forced operation thereof.

(h) Operation Restrictions—Control Alterations

Related sections are surmised from both the abovementioned index value $D^2$ calculation result and the various information sources, and control alterations such as restrictions to the operation pertaining thereto are performed. Example control alterations are given below:

(h-1) Alteration of Color Mode
(h-2) Alteration of Recording Speed
(h-3) Alteration of Halftone Line Number
(h-4) Alteration of Halftone Processing Method
(h-5) Restrictions to Paper Type
(h-6) Alterations to Resist Control Parameters
(h-7) Alteration to Image Forming Process Parameters (for Example, in an Electronic Copier System Image Forming Apparatus, the Charge Potential, Exposure Amount, Developing Bias and Transfer Bias and so on.)
(i) Replenishment and Replacement of Consumables and Component Parts Replenishment and replacement are automatically performed on the basis of the abovementioned index value $D^2$ calculation result (j) Automatic Repair When it is clear from both abovementioned index value $D^2$ calculation result and the various information sources that an abnormality exists in a specific region, a mode for repairing the target region is implemented.

A description is given next of the setting of the reference data group (standard space), the calculation of the index value (Mahalanobis distance) $D^2$, and the abnormality diagnosis results for the image forming apparatus shown in the abovementioned FIGS. 10 to 12 which constitutes a copier.

Embodiment 1

In embodiment 1, employing the copier shown in FIGS. 10 to 12, a plurality of sets of data pertaining to the 36 types information shown in the Table 3 were acquired during operation tests conducted prior to delivery and an initial reference data group (standard space) was established.

In the present embodiment means employing a resistance change element of which the principles and structure thereof are simple and, moreover, which can be compacted, was adopted means as the data acquisition means for acquiring temperature information data.

Figure 13:
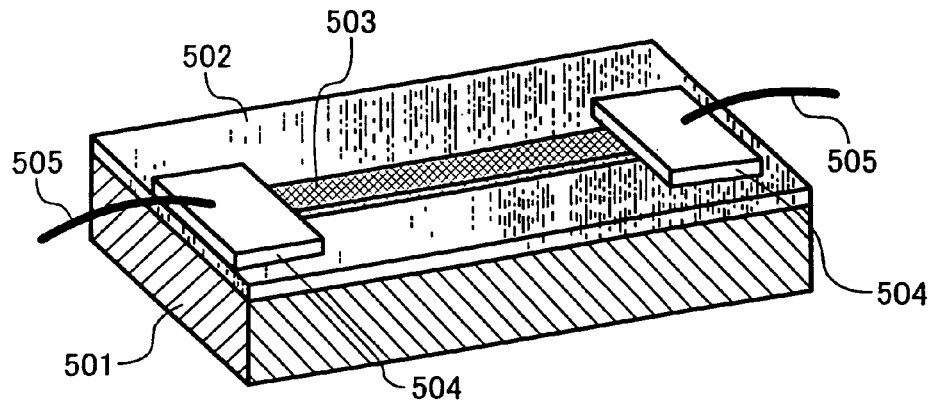
FIG. 13 is a perspective view of a thin film-type resistance change element used in embodiment 1 of the present invention.

FIG. 13 is a perspective view of the thin film-type resistance change element used in the present embodiment. This resistance change element was able to be manufactured as follows. First, an insulation film 502 was formed on a substrate 501, and a thin-film sensor part 503 configured from a metal or semiconductor material was provided thereon. Furthermore, a pad electrode 504 was provided in both ends of the sensor part 503 to which, finally, a lead wire 505 was connected. By virtue of the fact that accompanying a change in the temperature in the periphery of this resistance change element a change in the electrical resistance of the sensor part 503 occurs, such changes should be read as voltage or current flow changes. Because the sensor part 503 is a thin film the element as a whole can be compacted and assembled easily in the system.

Figure 14:
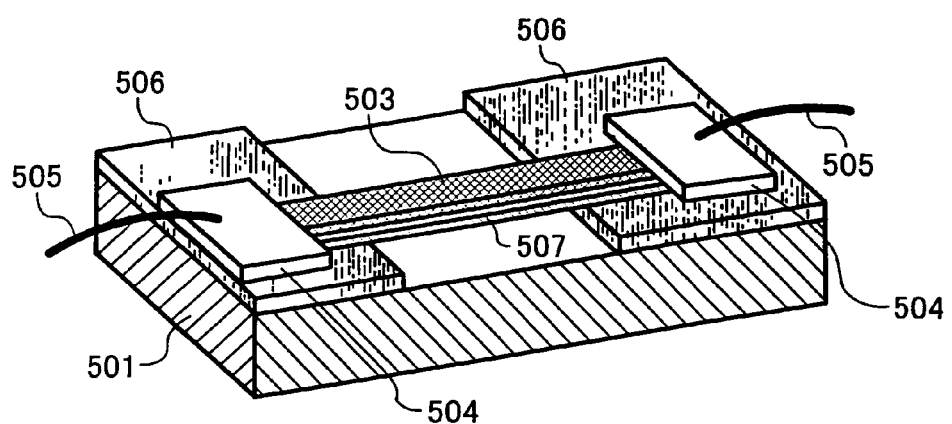
FIG. 14 is a perspective view of the resistance change element pertaining to embodiment 1.

FIG. 14 shows another resistance change element used in the present embodiment. This resistance change element is different to the resistance change element of FIG. 13 in that the thin-film sensor part 503 is arranged on a thin film bridge 507 provided to float in mid-air from the substrate 501 by way of a spacer 506. By the adoption of a structure such as this scattering and loss of heat from the sensor part 503 is obstructed and the responsivity of the sensor part 503 with respect to temperature is quicker. This structure, in which only radiant heat from the part to be measured can be detected, is ideal for non-contact measurement.

A compact humidity sensor that employs a humidity-sensitive ceramic is used to detect humidity. The basic principle thereof is based on the adsorption of water vapor by the humidity-sensitive ceramic and an increase in ion conduction and a decrease in electrical resistance of the ceramic due to the adsorbed water. The humidity-sensitive ceramic material is a porous material for which an alumina-based, apathite-based or $ZrO_2$-MgO-based material is used.

Figure 15:
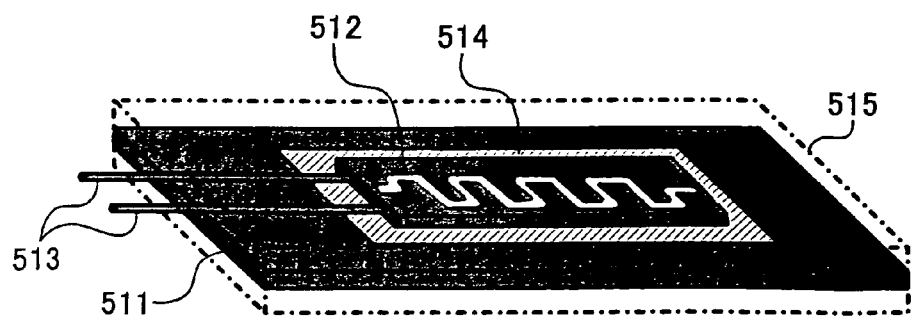
FIG. 15 is a perspective view of a moisture sensor used in embodiment 1.

FIG. 15 is a perspective view of the temperature sensor used in the present embodiment. A comb-shaped electrode 512 is provided on an insulation substrate 511 and a terminal 513 is connected to both ends thereof. A humidity-sensitive layer 514 (generally a ceramic) is additionally provided and the entirety thereof is covered by a case 515. By virtue of the fact that the electrical resistance decreases when the water vapor is adsorbed in the ceramic by way of the case 515, this should be read as changes in voltage or electric current.

The toner density is detected for each color. The toner density can be detected using a hitherto well-known toner density sensor, by way of example, using a sensor such as that described in Japanese Unexamined Patent Application No. H 6-289717 for measuring changes in the magnetic permeability of a developing liquid in a developing apparatus.

Figure 16:
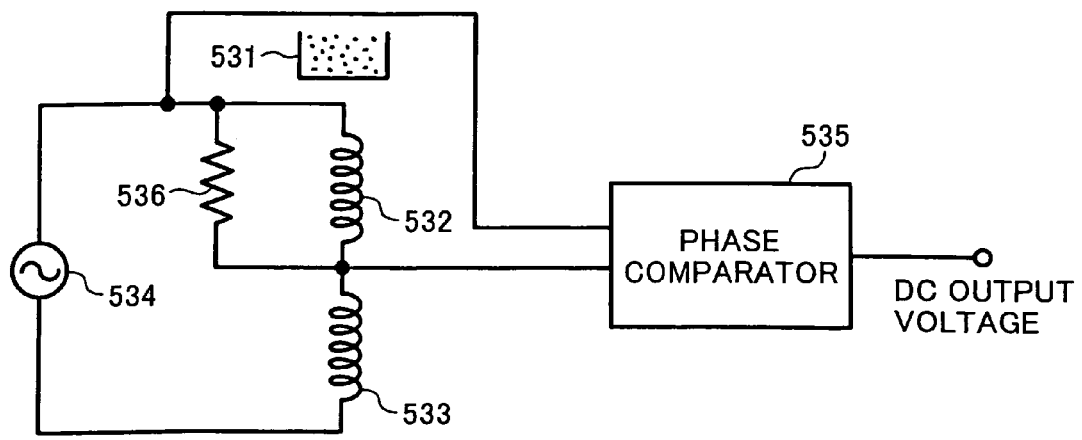
FIG. 16 is a schematic block diagram of a toner density detection part used in embodiment 1.

FIG. 16 is a schematic block diagram of the toner density detection part employed in the present embodiment. A reference coil 533 is differentially-connected to a detection coil 532 arranged in proximity of a developing agent 531 formed by the mixing of, by way of example, a magnetic carrier and a non-magnetic carrier. The inductance of the detection coil 532 fluctuates with respect to changes in magnetic permeability caused by fluctuations in the toner density (directly, the magnetic carrier) and, in contrast thereto, the inductance of the reference coil 533 thereto is not affected by changes in the toner density. An alternating current drive source 534 that is oscillation driven at, for example, 500 kHz is connected to the series circuit of the abovementioned two coils 532, 533 to drive the abovementioned two coils 532, 533. In this constitution, a differential output is fetched from the connection point of the two coils 532, 533 and this output is connected to a phase difference comparator 535 and, in addition, an output of the abovementioned alternating current drive source 534 is separately connected to the phase comparator 535 and the phases of the output voltage from the drive source 534 and the differential voltage are compared.

Figure 17:
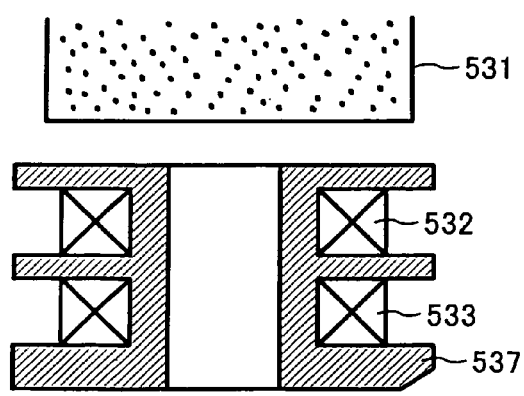
FIG. 17 is an assembly drawing of a coil of said toner density detection part.

At least one of the abovementioned two coils, that is to say, at least the detection coil 532 or the reference coil 533, are configured in the example shown in the diagram in such a way that a sensitivity setting resistor 536 (R1) is connected in parallel with the detection coil 532 whereupon, accordingly, the sensitivity characteristics can be controlled by the dulling of the sensitivity with respect to changes in the toner density. In FIG. 17, which is an assembly diagram of the two coils, the two coils 532, 533 are wound adjacently around a cylinder coil support body 537 in the vertical direction in the diagrams with the detection coil 532 located so as to detect changes in induction permeability in the side near the developing agent 531 and the reference coil 533 located in the far side therefrom in such a way as to ensure that there is no change in the magnetic permeability even when changes in toner density occur.

Developing γ data is acquired as follows. A stepped density pattern is formed by the formation of a stepped latent image voltage on a light-sensitive material in a test mode and the development thereof at specific conditions. This is read by a reflection density sensor and the relationship between the potential (potential difference) and the development reflection density is found. This gradient is taken as the γ value. This value is found for each color.

Developing initiation voltage data is acquired as follows. In the same way as for the abovementioned developing γ value, the relationship between the potential and the reflection density of the developed image is found using a test mode, and the potential at which the density of said developed image is 0 is found by extrapolation and is taken to represent the developing initiation voltage. This value is found for each color.

Next, a description will be given of the index value (Mahalanobis distance $D^2$) calculation result of the present embodiment.

In the present embodiment, a plurality of sets of data were acquired about the abovementioned 36 types of information during operation tests conducted prior to delivery, and these were used to form an initial reference data group. It was clear that, when the index value (Mahalanobis distance $D^2$) was calculated following the delivery and use of the copier employing this initial reference data group without alteration, there were times when the occurrence of abnormality in the device was unable to be accurately diagnosed.

Figure 18:
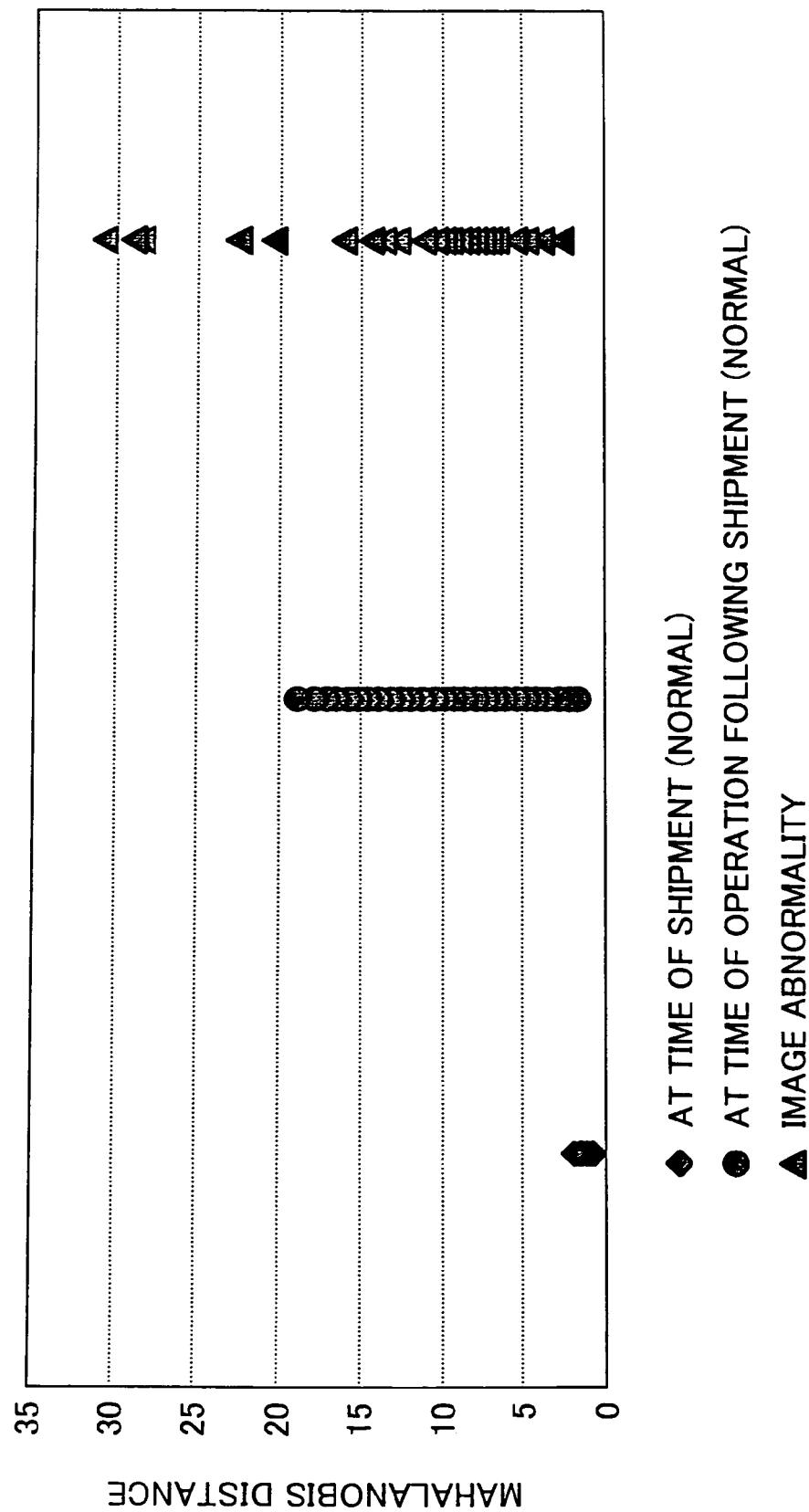
FIG. 18 is a graph showing the distribution of an index value $D^2$ when the reference data group has not been updated.

An index value calculation equation was determined at the time of delivery employing the initial reference data group comprising the data acquired during the operation tests, and FIG. 18 is a graph in which the index value (Mahalanobis distance $D^2$) of different data calculated employing this index value calculation equation have been plotted. The "(normal) at time of shipment" value at the left side of the diagram represents an index value calculated for the data of the operation tests that makes up the abovementioned initial reference data group.

In addition, the "(normal) when operated following shipment" value in the center part of the diagram represents an index value calculated about the abovementioned data of 36 types of information acquired at a prescribed interval (interval of 1 to 3 days) following the arrangement of the device on which the abovementioned operation tests have been conducted in the usage location to be used by the user. At the time of this data acquisition there was no occurrence of apparatus abnormality (image abnormality).

Figure 19:
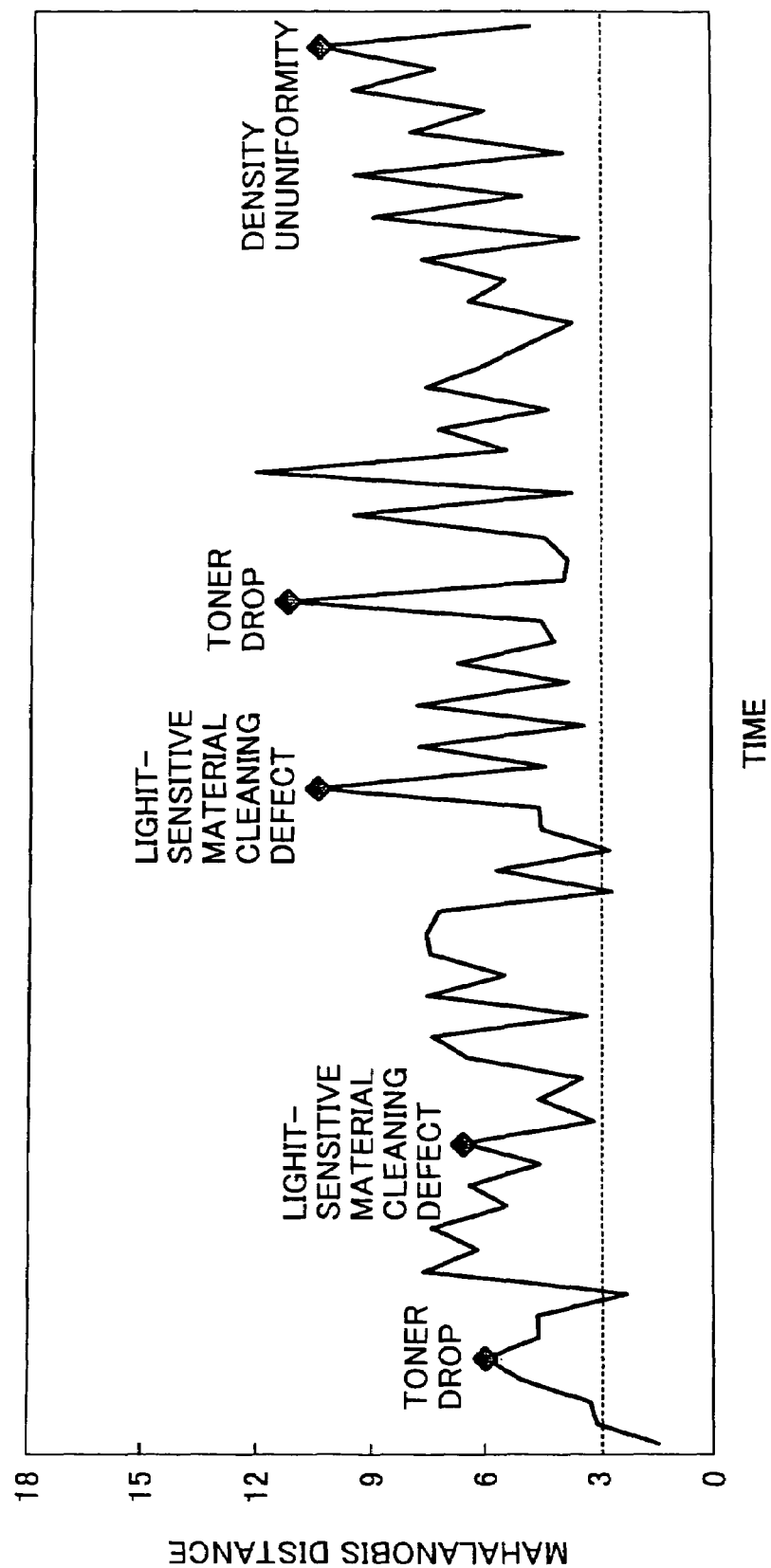
FIG. 19 is a graph illustrating the transitions over time of the index value $D^2$ when the reference data group has not been updated.
Figure 20:
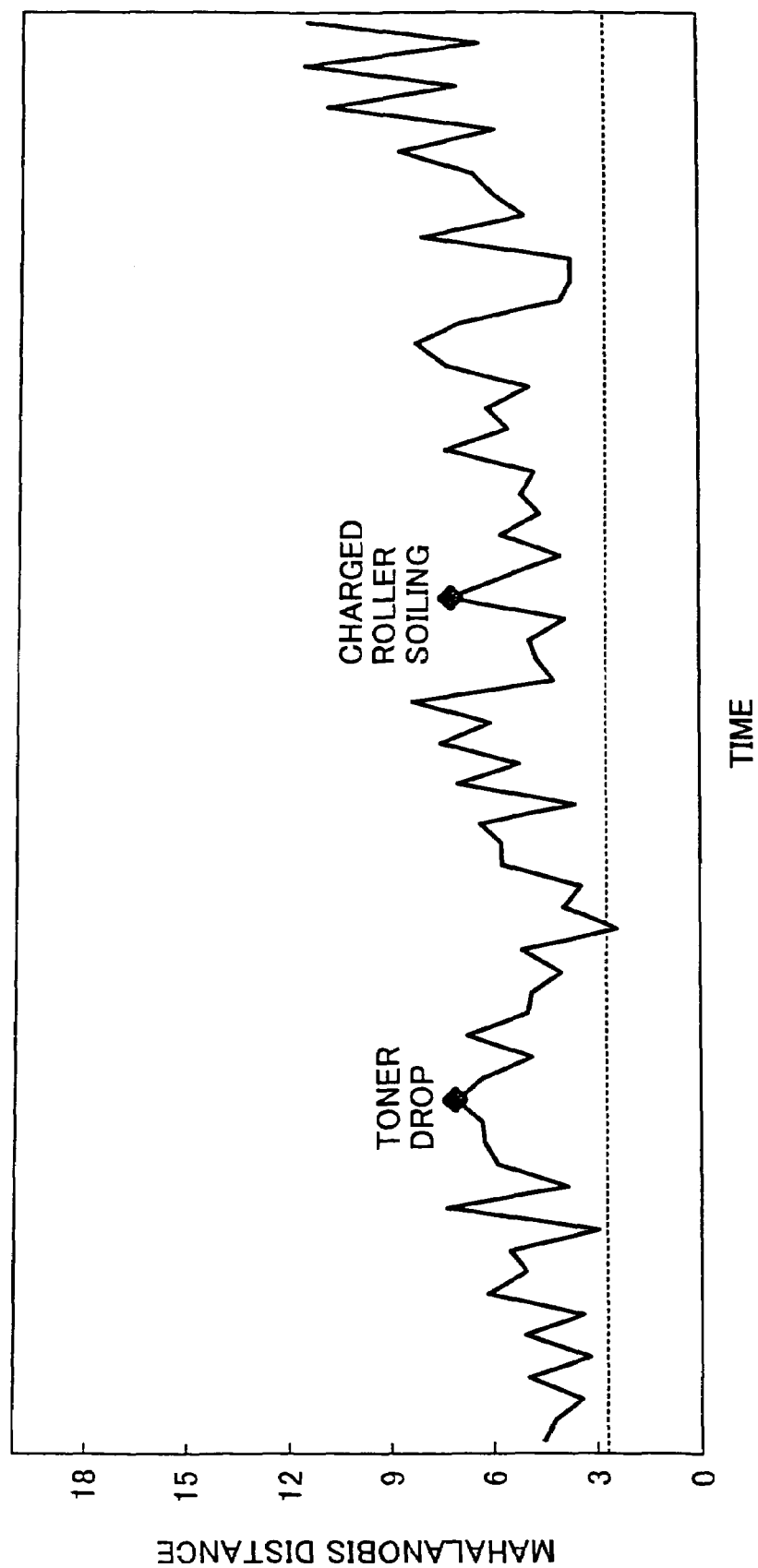
FIG. 20 is a graph illustrating the transitions over time of the index value $D^2$ when the reference data group has not been updated.

In addition, the "image abnormality" value at the right side of the diagram represents an index value calculated for the abovementioned data of 36 types of information acquired at a prescribed interval (1 to 3 day interval) for a period following the initiation of use by the user in which a apparatus abnormality has occurred (image abnormality). FIG. 19 and FIG. 20 show the transitions over time of the index value during the period when the abnormality occurred (Mahalanobis distance $D^2$).

It is clear from the results of FIG. 18 to FIG. 20 that, when the reference space and the index value calculation equation are determined employing the initial reference data group at the time of shipment which constitutes data acquired during operation tests at the time of shipment, there are times when the index value (Mahalanobis distance $D^2$) increases even when the devices are operating in a normal state following shipment. Increases in the index value (Mahalanobis distance $D^2$) in this way are appraised as an abnormality and result in an erroneous diagnosis of abnormality. In addition, it was found by comparison that there were times when the index value at times of normality and the index value at times of abnormality following shipment were the same and, accordingly, it is clear that there were times when normality/abnormality appraisals were unable to be made.

Thereupon, in the present embodiment, data about the same information as that found in the abovementioned operation tests is regularly acquired following the shipment of the device and arrangement in the location of use to be used by the user and, by the addition thereof to the reference data group, the reference data group is regularly updated.

Figure 21:
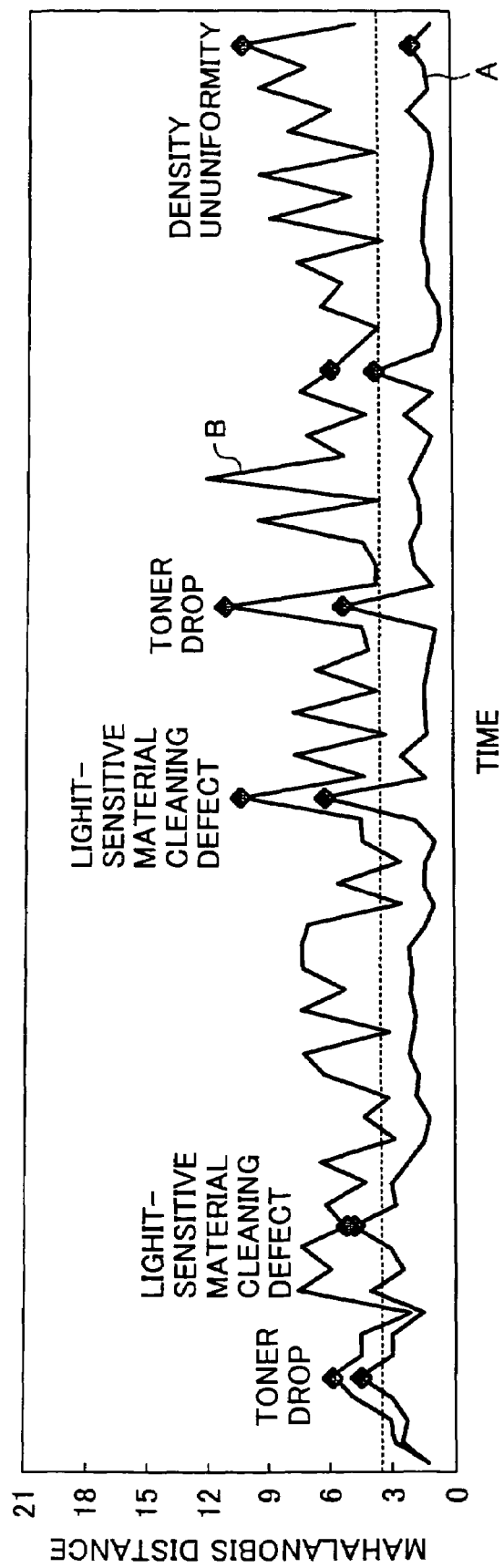
FIG. 21 is a graph illustrating the transitions over time of the index value $D^2$ when the reference data group has been updated of embodiment 1.

FIG. 21 is a graph illustrating the transitions over time (A of the diagram) of the index value $D^2$ (Mahalanobis distance) when the reference data group has been regularly updated. B in the diagram represents a comparative example of the transitions over time of the index value $D^2$ when the reference data group has not been regularly updated. It is clear from these results that, when the reference data group is regularly updated, the index value $D^2$ when the device is in a normal condition is stable within a range smaller than a threshold value 3 shown by the broken line in the diagram and abnormality of the device can be accurately appraised. On the other hand, it is clear that when the reference data group is not updated there are times when the index value $D^2$ significantly exceeds the threshold value 3 even when the apparatus is operating in a normal condition and normality/abnormality appraisals are unable be made.

Embodiment 2

In the present embodiment, in which the reference data group is updated in the same way as the abovementioned embodiment 1, data of the data acquired about the same prescribed information of the abovementioned operation tests adjudged to be abnormality data is not added to the reference data group. More specifically, the index value $D^2$ (Mahalanobis distance) of the data acquired about the abovementioned prescribed information is calculated employing an index value calculation equation determined by the reference data group prior to updating. When this index value is larger than a set value established in advance (for example the above threshold value 3), the abovementioned acquired data is adjudged as abnormality data and is not added to the reference data group.

Figure 22:
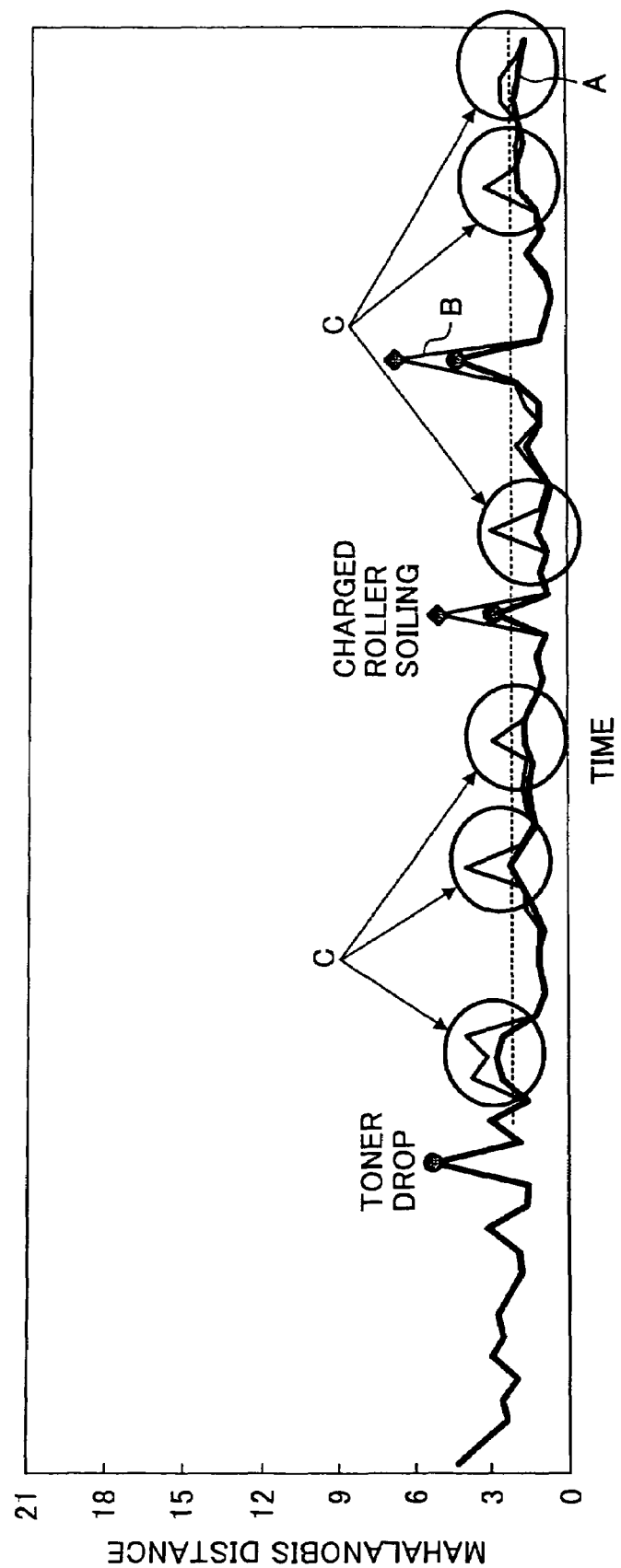
FIG. 22 is a graph illustrating the transitions over time of the index value $D^2$ when there has been no addition of abnormality data in the updating of the reference data group of embodiment 2.

FIG. 22 is a graph illustrating the transitions over time (A in the diagram) of the index value $D^2$ when, in the updating of the reference data group, no abnormality data is added. B in the diagram is a comparative example that represents the transitions over time of the index value $D^2$ when abnormality data is added. It is clear from these results that, when there is no abovementioned abnormality data added to the reference data group, erroneous appraisals of the index value having exceeded the threshold value 3 at times when the apparatus is operating in a normal condition can be decreased. On the other hand, when the abovementioned abnormality data is added to the reference data group there is many instances of the abovementioned erroneous appraisal occurring.

Embodiment 3

In the present embodiment, in which the reference data group is updated in the same way as the abovementioned embodiment 1, after the quantity of change in the index value $D^2$ (Mahalanobis distance) calculated for specific data contained in the initial reference data group has lowered and stabilized, the updating of the reference data group is halted. More specifically, the index value $D^2$ of a specific single set of data contained in the initial reference data group is calculated employing the index value calculation equation determined using an updated reference data group. When the quantity of change of the index value for update halt appraisal is found to be continuously within a prescribed range a prescribed number of times the updating of the reference data group is then halted.

Figure 23:
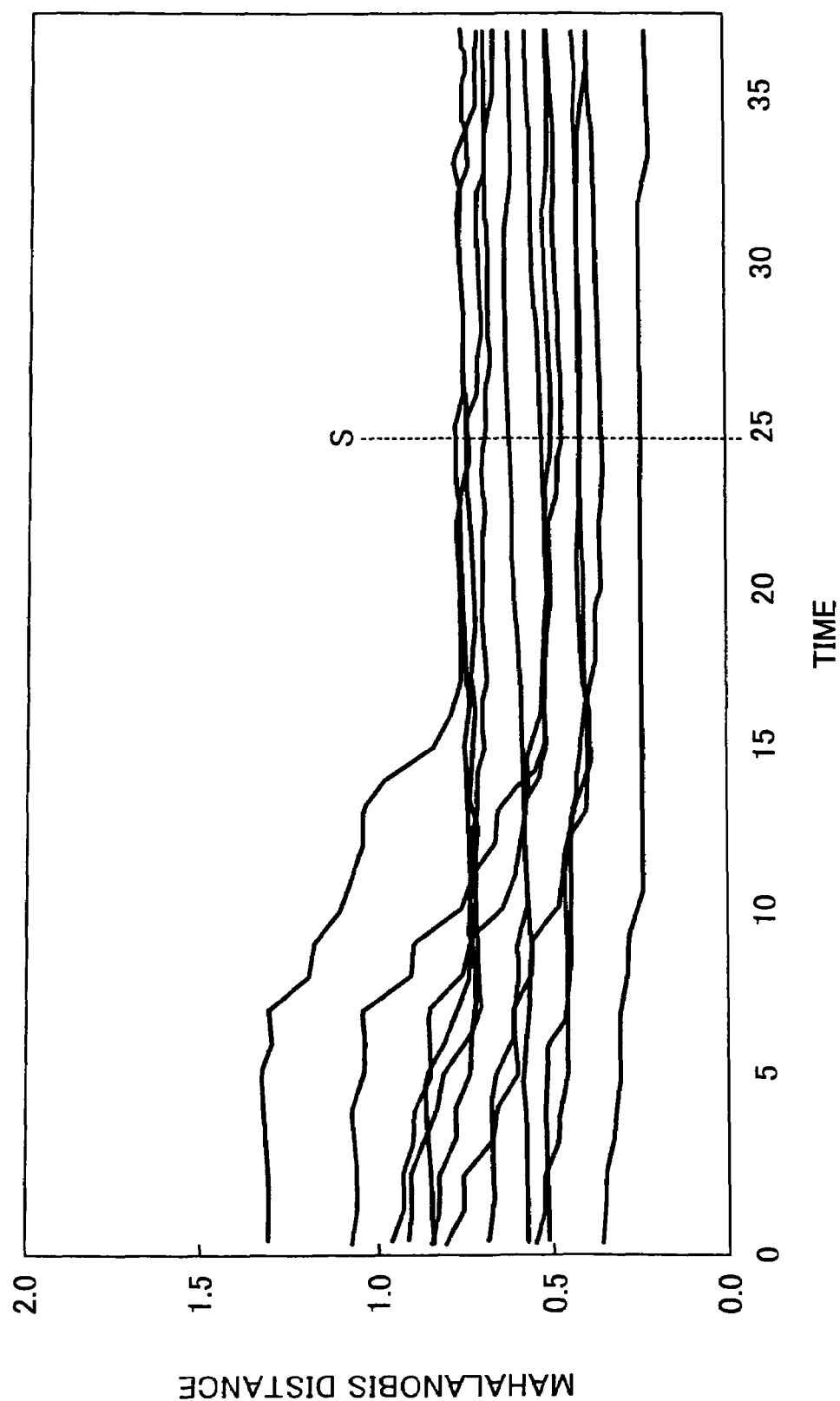
FIG. 23 is a graph illustrating the transitions over time of the index value for the update halt appraisal of 12 apparatuses.
Figure 24:
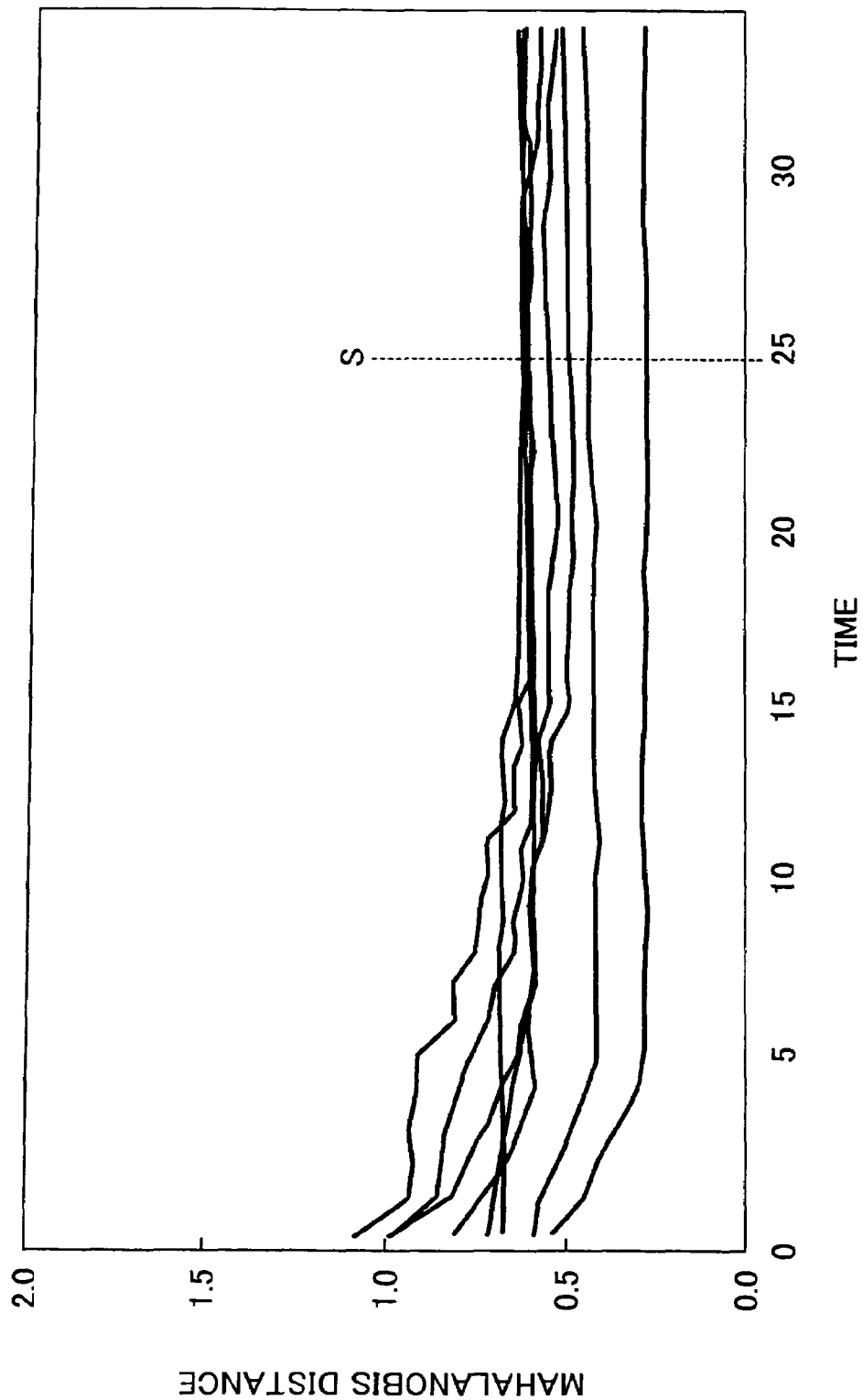
FIG. 24 is a graph illustrating the transitions over time of the index value for the update halt appraisal of 8 apparatuses.

FIG. 23 and FIG. 24 are graphs illustrating the transitions over time of the index value for the abovementioned update halt appraisal of 12 apparatuses and 8 apparatuses respectively. It is clear from these diagrams that the index value for the abovementioned update halt appraisal has stabilized about 25 days (in the diagram S) following the initiation of the use of the apparatuses.

Figure 25:
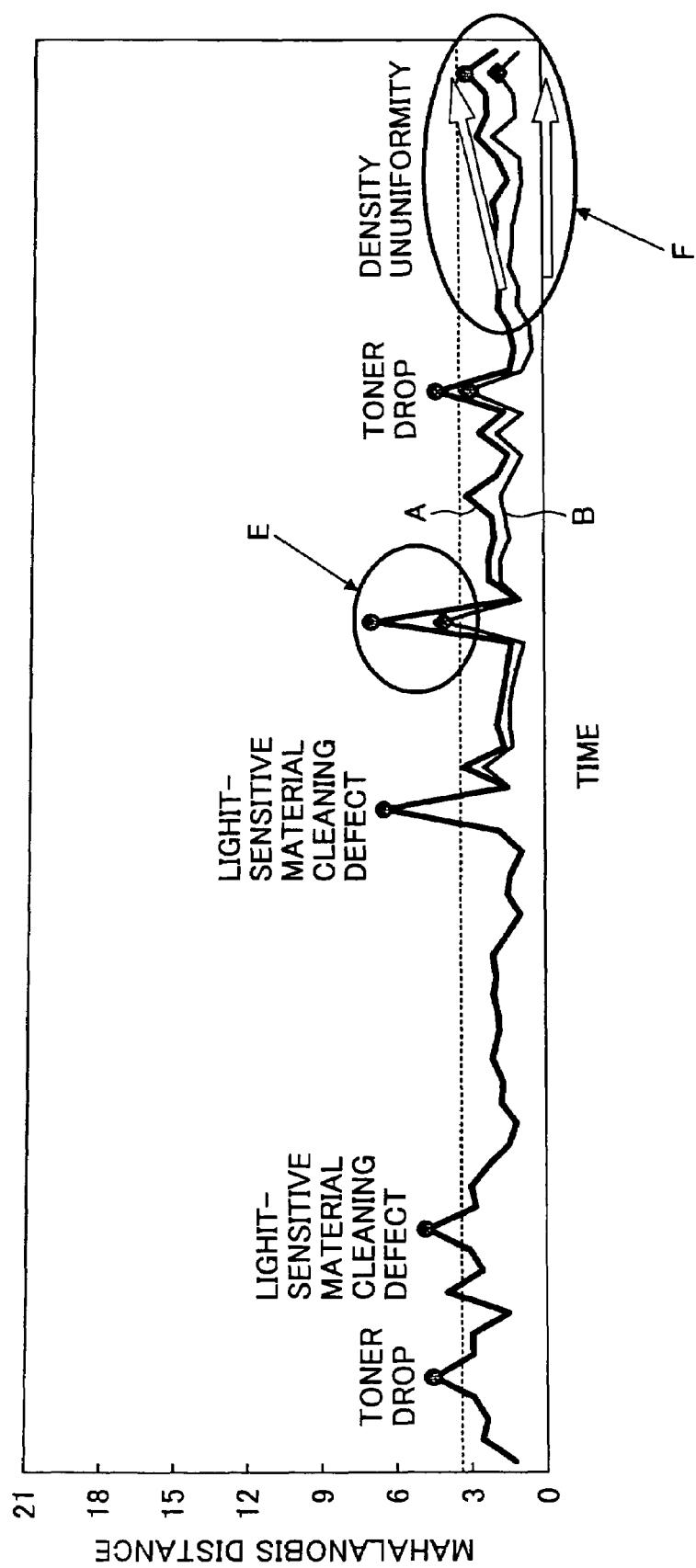
FIG. 25 is a graph illustrating the transitions over time of the index value $D^2$ where the update of the reference data group has been halted when the index value for update halt appraisal is stable of embodiment 3.

FIG. 25 is a graph illustrating the transitions over time (A in the diagram) of the index value $D^2$ (Mahalanobis distance) where the updating of the reference data group has been halted upon stabilization of the index value $D^2$ for update halt appraisal. B in the diagram is a comparative example of the transitions over time of the index value $D^2$ when updating of the reference data group has been continued even after the index value for the update halt appraisal has stabilized. It is clear from these results that, although an average rise in the index value occurs when the updating of the reference data group is halted upon stabilization of the index value for update halt appraisal, the sensitivity with respect to abnormality (region shown by E in the diagram) is improved. More particularly, it is clear from the region shown by F at the right side of the diagram that a changed condition in which there is a gradual deterioration of the apparatus caused by density ununiformity can be appraised from a rise in the index value.

Embodiment 4

In the present embodiment the abovementioned reference data group is managed by division of the abovementioned plurality of types of information into individual data groups comprising data acquired about information that is easily affected by the copier usage conditions by the user and shared data groups comprising the data acquired about other information. In the present embodiment only data acquired about individual data groups is added to the reference data group, and new data acquired about the remaining shared data groups is not added thereto.

Figure 26:
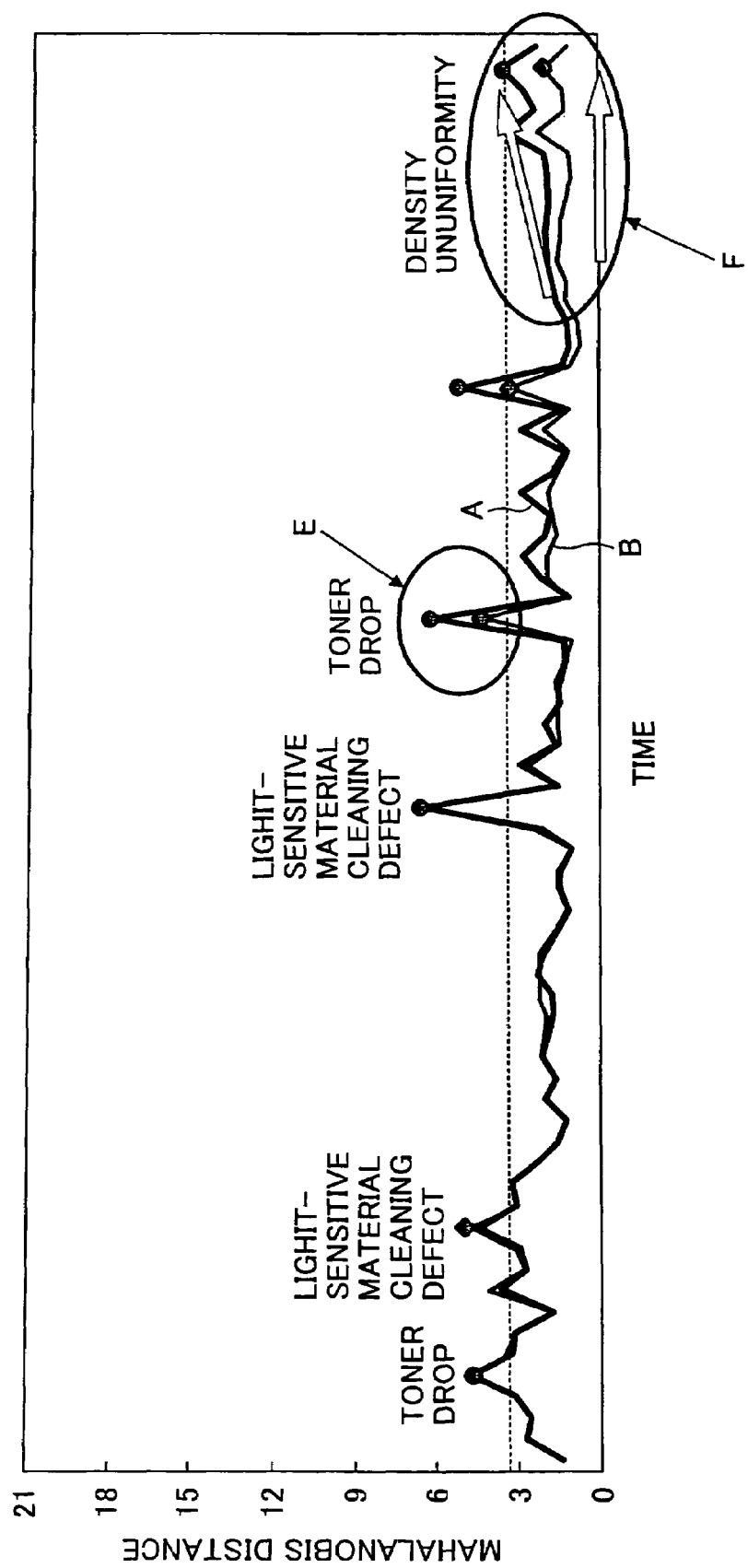
FIG. 26 is a graph illustrating the transitions over time of the index value $D^2$ where the update of the reference data group has been halted by the new acquisition and addition of data about individual data groups only of embodiment 4.

FIG. 26 is a graph illustrating the transitions over time of the index value $D^2$ (A in the diagram) when the reference data group is updated only by the new acquisition and addition of data about the individual data groups of the abovementioned reference data group. Here, the acquired data of the shared data groups is pseudo-sequentially added during operation tests conducted prior to shipment. B of the diagram, as a comparative example, shows the transitions over time of the index value $D^2$ when the data of both the individual data groups and the shared data groups are added and updated. It is clear from these results that, although there is an average rise in the index value when only data about the individual data groups is added and updated, the sensitivity with respect to abnormality (region shown by E in the diagram) is improved. More particularly, it is clear from the region shown by F at the right side of the diagram that a changed condition in which there is a gradual deterioration of the apparatus caused by density ununiformity can be appraised from a rise in the index value.

Figure 27:
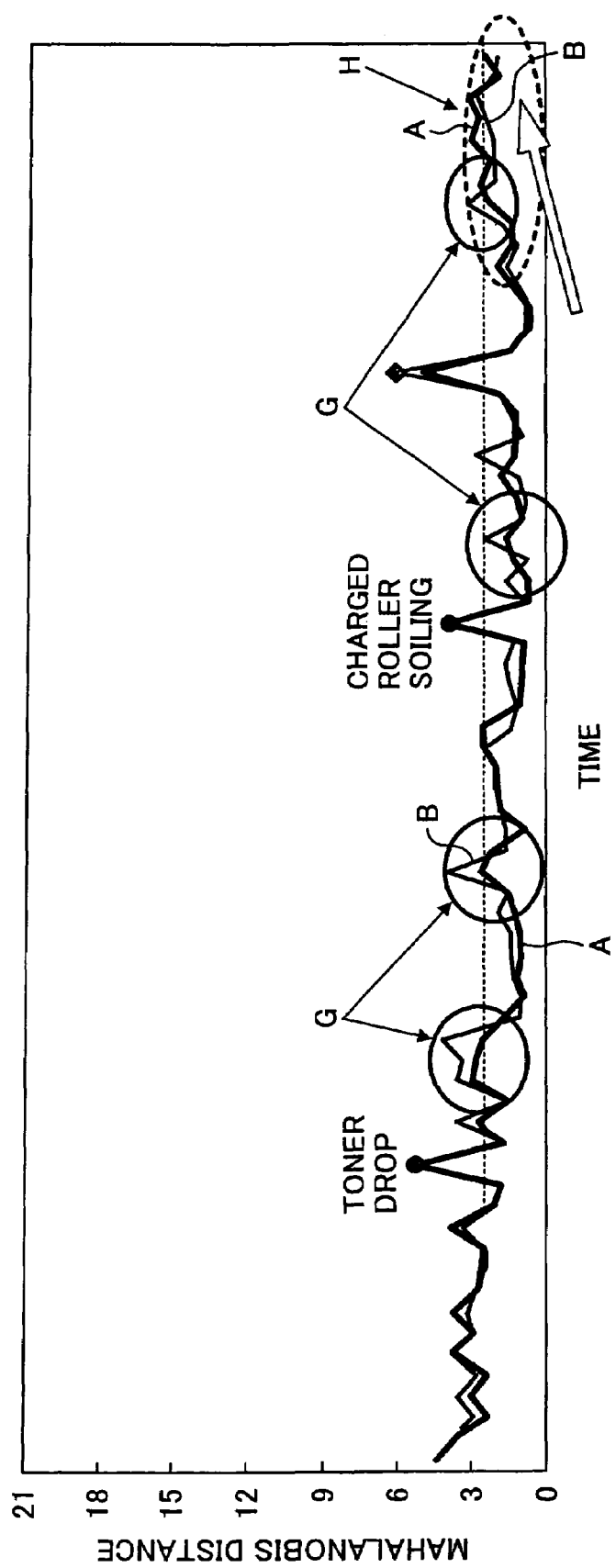
FIG. 27 is a graph illustrating the transitions over time of the index value $D^2$ where the update of the reference data group has been halted by the new acquisition and addition of data about individual data groups only of embodiment 5.

FIG. 27 is a graph illustrating the transitions over time (A in the diagram) of the index value $D^2$ when the reference data group is updated by only the new acquisition and addition of data about the individual data groups of the abovementioned reference data group. Here, data acquired about the shared data groups for other copiers of the same type as the apparatus that serves as the subject of the testing is pseudo-sequentially added. B of the diagram, as a comparative example, shows the transitions over time of the index value $D^2$ when the data of both the individual data groups and the shared data groups are newly acquired and added to update the reference data group. It is clear from these results that when only data about the individual data groups is added and acquired in the updating the normal condition can be accurately appraised and there are no erroneous appraisals of an abnormal condition. Tn contrast thereto, when data about both the individual data groups and the shared data groups are newly acquired and added there are many instances in which, as shown by G in the diagram, an erroneous appraisal of abnormality based on the index value $D^2$ having exceeded the threshold value (=3) are made. More particularly, it is clear from the region shown by H at the right side of the diagram that a changed condition in which there is a gradual deterioration of the apparatus caused by density ununiformity can be appraised from a rise in the index value.

Based on the present invention as described above, by virtue of the fact that the acquisition of data about a plurality of types of information is implemented about a plurality of image forming apparatuses of a type the same as the image forming apparatus that serves as the subject for condition appraisal, compared to when the data acquisition is performed on one image forming apparatus only, a sufficient quantity of data to make up a reference data group can be acquired efficiently and in a short time. Moreover, by virtue of the fact that the abovementioned reference data group contains all of said plurality of sets of data acquired about the abovementioned plurality of image forming apparatuses, an appropriate reference data group that corresponds to a normal condition virtual image forming apparatus in which the average structure and characteristics of the machine type thereof are reflected can be configured.

In addition, by virtue of the fact that the acquisition of data from which the initial reference data group is made up is implemented during operation tests conducted following the manufacture of the image forming apparatus, a sufficient quantity of data necessary for the construction of an initial reference data group can be ensured prior to delivery to the user of an image forming apparatus on which operation tests have been completed. Moreover, because the rate of abnormality occurring in image forming apparatus during operation tests conducted following manufacture is low, an appropriate initial reference data group that corresponds to a virtual image forming apparatus that better approximates the normal condition is produced.

As is described above, during operation tests conducted prior to delivery of the image forming apparatus to the user, an initial reference data group that appropriately corresponds to a virtual image forming apparatus of normal condition can be efficiently obtained. Accordingly, in the initiation of the bulk production of a new type of image forming apparatus, the initial reference data group thereof can be installed in the image forming apparatus delivered to the user whereupon, accordingly, a highly reliable abnormality diagnosis of the image forming apparatus can be initiated promptly following the delivery thereof.

In addition, in the present invention, following the initiation of the usage of the image forming apparatus, the data of a plurality of types of information about said image forming apparatus is acquired and added at prescribed update timings to update the reference data group. By virtue of the fact that, based on this updating, a reference space, that is to say, an index value calculation equation that is adjusted to the deviations in the condition of the device can be determined, a more accurate diagnosis of abnormality is possible.

In addition, in this present invention, the abnormality data of the data acquired for the updating of the reference data group need not be added to the reference data group. In this case, abnormally large fluctuations in the reference space, that is to say, in the index value calculation equation, are prevented, and a more accurate diagnosis of abnormality is possible.

In addition, in the present invention, following the initiation of usage of the image forming apparatus, the index value $D^2$ of the newly acquired data is calculated employing the index value calculation equation determined on the basis of the updated reference data group and, where the quantity of change of the index value $D^2$ (for example, difference with the previous calculated index value) lies within a range established in advance, the updating of the reference data group is halted. In this case the changes in condition caused by deterioration of the apparatus over time can be appraised after the updating of the reference data group has been halted.

In addition, in the present invention, of the abovementioned reference data group only the individual data groups from which the data of information (element) that deviate easily due to the operation conditions following the initiation of usage of the device need be updated. In this case the detection capability of apparatus abnormality pertaining to information (elements) that is easily affected by the usage conditions by the user of the image forming apparatus are improved.

It should be noted that, in the present invention, using a management apparatus provided in a monitoring center that is able to communicate with a plurality of copiers (image forming apparatus) by way of a communication line, the reference data group, index value calculation equation and abnormality diagnosis results and so on for each operation device can be remotely and centrally managed.

Figures 28, 29:
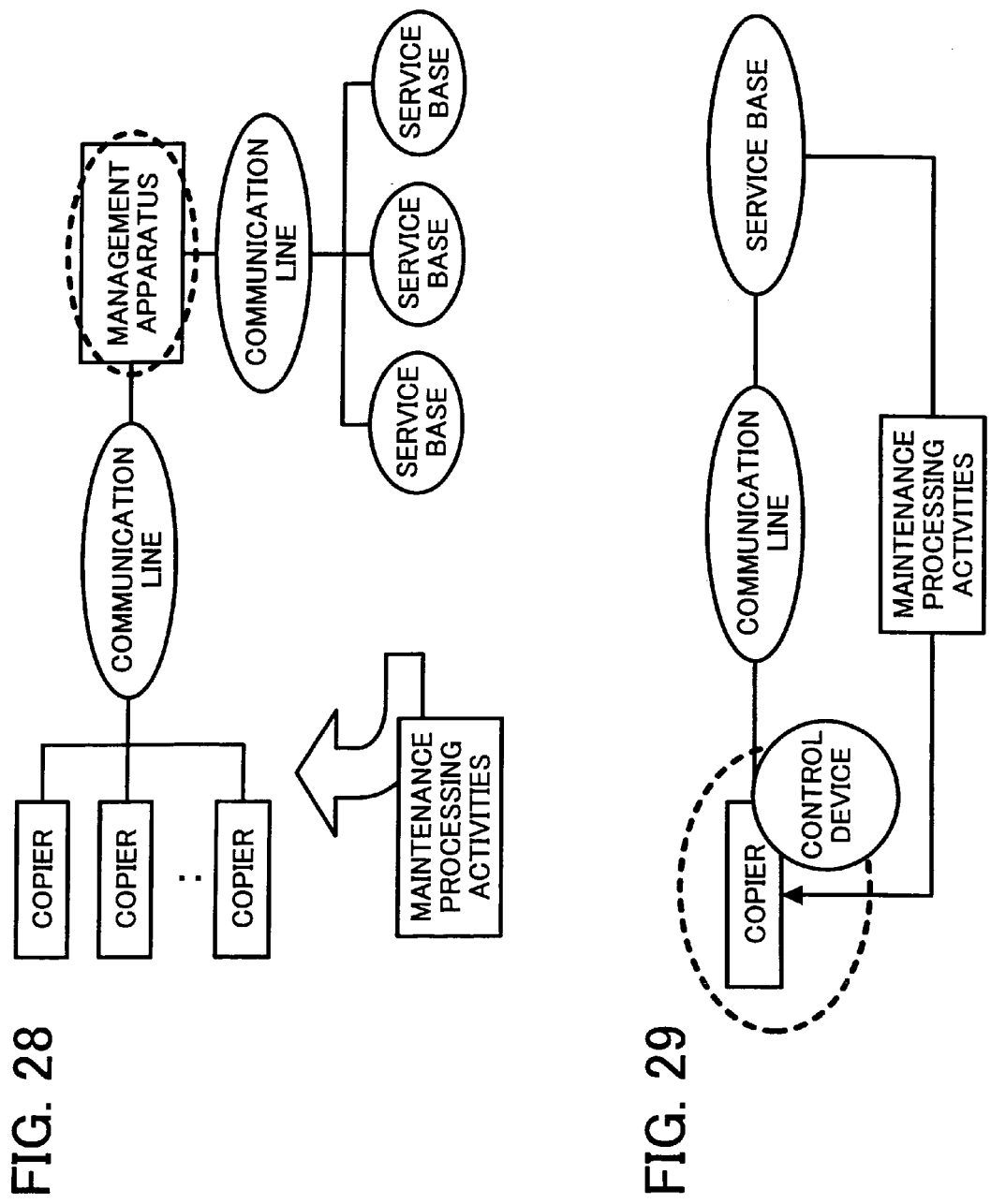
FIG. 28 is a block diagram that schematically illustrates the constitution of a management system configured to afford communication between a management apparatus provided in a monitoring center and a plurality of copiers by way of a communication line.
FIG. 29 is a schematic block diagram of a management system that facilitates communication between a copier in which a condition appraisal apparatus is installed to serve as a management apparatus and a service base computer apparatus by way of a communication line.

FIG. 28 is a block diagram that schematically illustrates the constitution of a management system configured to afford communication between a management apparatus provided in a monitoring center and a plurality of copiers by way of a communication line. Communication is possible in this management system by way of communication lines provided between the abovementioned management apparatus and a service base computer apparatus that implements the maintenance service of the copier. Examples of the communication lines that can be employed include dedicated lines, common lines, Internet, Local Area Networks and so on.

In addition, the abovementioned condition appraisal apparatus may be installed in the copiers or it may be installed in the management apparatus. If the condition appraisal apparatus is installed in the copiers a condition appraisal and an abnormality diagnosis is implemented by each copier and the data results thereof are sent to the management apparatus by way of a communication line. When the management apparatus receives this diagnostic result of the occurrence of abnormality it sends this result to a managing service base. Having received a diagnosis of the occurrence of abnormality a service person from the base attends the location where the copier is installed and carries out the necessary maintenance activities such as maintenance management and the line.

In addition, the abovementioned plurality of types of data acquired by the copiers may be sent regularly to the management apparatus whereupon, accordingly, the management apparatus centrally manages the reference data group employed by the copiers and the information related to the index value calculation equation. The information related to the index value calculation equation determined by the management apparatus is sent from the management apparatus to the copiers by way of a communication line. If the management apparatus determines the index value calculation equation employed by the copiers, the abovementioned shared data group data may be added to the reference data group that is employed for the determining of the index value calculation equation of the copiers.

In addition, in the present invention, the abovementioned condition appraisal apparatus may be installed as a management apparatus in the copiers (image forming apparatus) whereupon communication is possible between the copiers, the service base and the computer apparatus by way of a communication line.

FIG. 29 is a schematic block diagram of a management system in which a copier in which a condition appraisal apparatus is installed as the management apparatus and a service base computer apparatus are able to communicate by way of a communication line. The condition appraisal apparatus used as the management apparatus may be configured from a single-chip LSI or the like. In this management system the abnormality diagnostic result obtained by the copiers is sent directly to the managing service base by way of a communication line. Having received the diagnosis of the occurrence of abnormality a service person from the base attends the location where the copier is installed and carries out the necessary maintenance activities such as maintenance management and the like.

The management apparatus (condition appraisal apparatus) of the abovementioned management system of FIG. 28 and FIG. 29 performs data accumulation of various apparatus information of the copiers and predicts and appraises abnormality such as breakdown and the need for a service person to attend.

FIGS. 30A to 30C and FIGS. 31A to 31D are flowcharts illustrating the flow of the complete routine from the time of data accumulation when the machine (image forming apparatus) is shipped from the manufacturing plant until the service base has implemented maintenance processing.

Figure 30C:
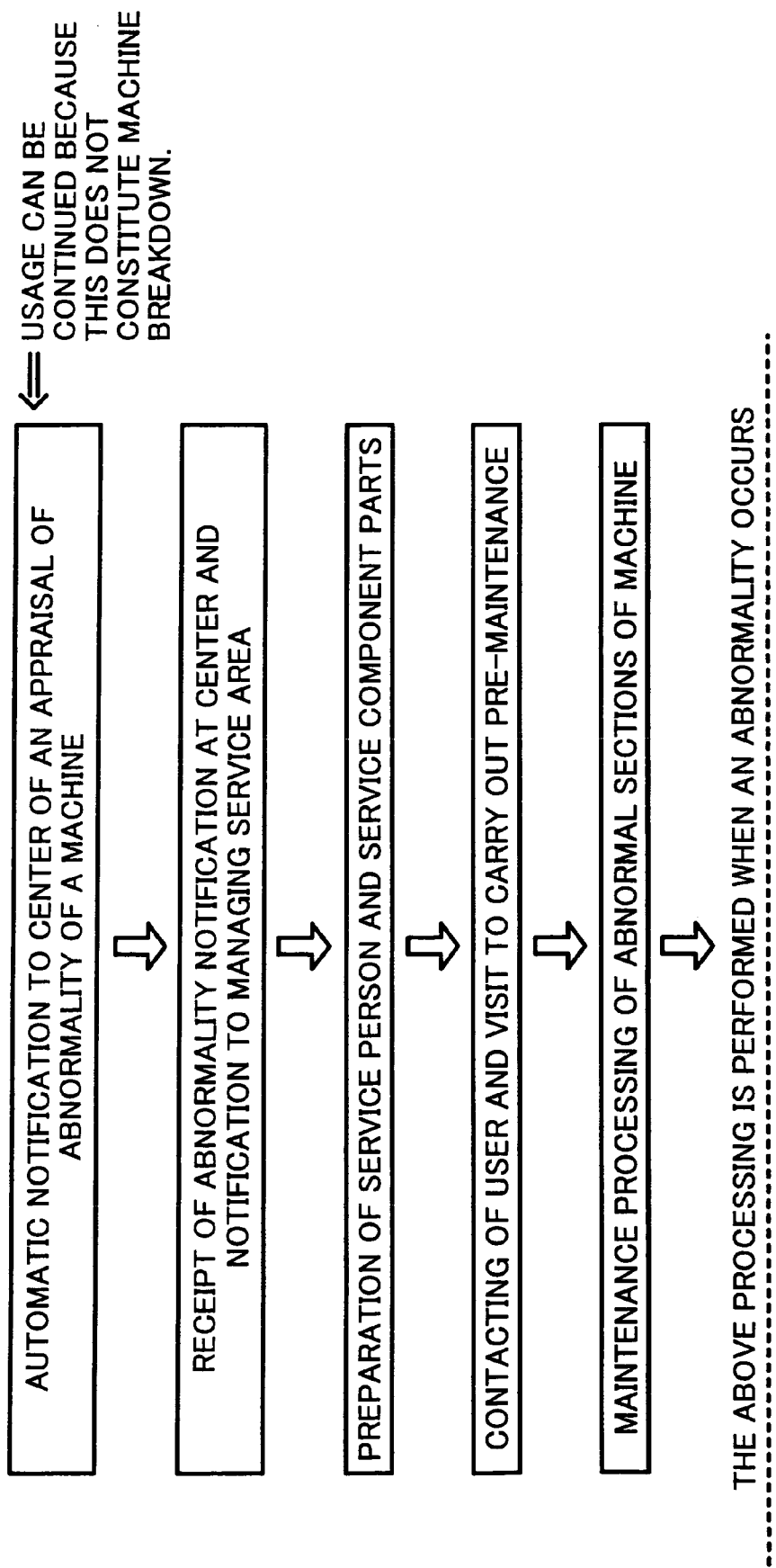

In the example of FIGS. 30A to 30C, first, at the plant where the machine is manufactured, a sensor group is established for detecting data of the abovementioned various information about the machine to be shipped. Next, the detected values of the abovementioned established sensor group and the values of the control parameters that serve as the abovementioned various types of information data are collected from numbered lots of the machine when bulk production is initiated. Next, the collected data is tallied and used to form a reference space comprising a reference data group that expresses the normal condition of the machine. Using this reference space, an index value calculation equation for calculating the abovementioned index value ($D^2$) for condition appraisal is established.

When the abovementioned machine is sold and installed at the user site a data communication line is established between the machine and a monitoring center. Next, the abovementioned index value calculation equation is stored and introduced into the condition appraisal apparatus installed in the machine, and user registration is carried out at the monitoring center.

The monitoring center is automatically notified of when, following the initiation of the use of the machine by the user, apparatus abnormality has been appraised as occurring by the condition appraisal apparatus installed in the machine. By virtue of the fact that breakdown of the machine has not occurred at this time the apparatus can continue to be used normally. The abnormality information is received at the monitoring center and the managing service area base is then notified of said. At the service base where this notification is received a service person and service component parts are prepared. Contact is made with the relevant user whereupon the location where the machine is installed is attended for the purpose of implementing a pre-maintenance processing of the machine that involves maintenance of the abnormal sections of the machine to prevent the occurrence of the breakdown thereof in advance.

In the example of FIGS. 31A to 31D, first, at the plant where the machine is manufactured, a sensor group is established for detecting data of the abovementioned various information about the machine to be shipped. Next, the detected values of the abovementioned established sensor group and the values of the control parameters that serve as the abovementioned various types of information data are collected from numbered lots of the machine when bulk production is initiated. Next, the collected data is tallied and used to form a reference space 1 comprising a reference data group that represents the normal condition of the machine. The data of this reference space 1 is sent to the index value.

When the abovementioned machine is sold and installed at the user site a data communication line is established between the machine and a monitoring center. Next, the abovementioned index value calculation equation is stored and introduced into the condition appraisal apparatus installed in the machine, and user registration is carried out at the monitoring center.

The monitoring center is automatically notified of when, following the initiation of the use of the machine by the user, apparatus abnormality has been appraised as occurring by the condition appraisal apparatus installed in the machine. Abnormality appraisal is performed at the monitoring center by comparing the data at the point of sale comprising the detected values of the abovementioned sensor group sent from the machine with the reference data group (reference space 1) of the abovementioned machine in its normal condition. Next, the data comprising the detected values and so on of the abovementioned sensor groups sent from a large number of machines and the data collected at the abovementioned plant are added to the reference data group to form a reference space 2 that constitutes an updated reference data group expressing the normal condition of the machine. Following the updating of the reference space, said updated reference space is used to establish an index value calculation equation for detecting the abovementioned index value ($D^2$) for condition appraisal and to perform an abnormality appraisal.

Thereafter the service base of the managing service area is notified by the monitoring center of when an abnormality in a specific machine has been appraised. At the service base where this notification is received a service person and service component parts are prepared. Contact is made with the relevant user whereupon the location where the machine is installed is attended for the purpose of implementing a pre-maintenance processing of the machine that involves maintenance of the abnormal sections of the machine to prevent the occurrence of the breakdown thereof in advance. It should be noted that, when this abnormality appraisal is performed, data comprising the detected values and so on of the abovementioned sensor group are deleted from the reference data group of said machine at that time to re-update the reference space.

It should be noted that, although the description given above pertains to a case where the electronic device is an image forming apparatus, the present invention can have application in the condition appraisal and diagnosis of the occurrence of abnormality in electronic devices other than image forming apparatus such as home electronic devices and computer apparatus and so on.

Based on the present invention as described above, by virtue of the fact that the acquisition of data about a plurality of types of information is implemented on a plurality of electronic devices of a type the same as the electronic devices that serves as the subject for condition appraisal, compared to a case in which the data acquisition is performed on one electronic device only, a sufficient quantity of data to make up a reference data group can be acquired efficiently and in a short time. Moreover, by virtue of the fact that the abovementioned reference data group contains all of said plurality of sets of data acquired about the abovementioned plurality of image forming apparatuses, an appropriate reference data group that corresponds to a normal condition virtual image forming apparatus in which the average structure and characteristics of the machine type are reflected can be configured.

In addition, by virtue of the fact that the acquisition of the data from which the initial reference data group is made up is implemented during operation tests conducted following the manufacture of the image forming apparatus, a sufficient quantity of data necessary for the construction of an initial reference data group can be ensured prior to delivery to the user of an image forming apparatus on which operation tests have been completed. Moreover, because the rate of abnormality occurring in image forming apparatus during operation tests conducted following manufacture is low, the initial reference data group appropriately corresponds to a virtual image forming apparatus that better approximates the normal condition.

As is described above, during operation tests conducted prior to delivery of the image forming apparatus to the user, an initial reference data group that appropriately corresponds to a virtual image forming apparatus of normal condition can be efficiently obtained. Accordingly, this has the effect whereby, in the initiation of the bulk production of a new type of image forming apparatus, the initial reference data group thereof can be installed in the image forming apparatus delivered to the user whereupon, accordingly, a highly reliable abnormality diagnosis of the image forming apparatus can be initiated promptly following the delivery thereof.

Various modifications will become possible for those skilled in the art after receiving the teachings of the present disclosure without departing from the scope thereof.

What is claimed is:

1. An abnormality diagnosing method comprising:
   acquiring in advance a plurality of sets of data of a plurality of types of information related to a condition of an electronic device;
   determining an index value calculation equation for calculating an index value employed for a condition appraisal of the electronic device based on a reference data group made up of said plurality of sets of data;
   acquiring said data of a plurality of types of information about the electronic device that serves as the subject for condition appraisal;
   calculating an index value based on said index value calculation equation and said data of a plurality of types of information acquired about said electronic device that serves as the subject for condition appraisal; and
   appraising the condition of said electronic device that serves as the subject for condition appraisal and diagnosing the occurrence of abnormality in said electronic devices based on a result of a comparison result of said index value and a reference value established in advance,
   wherein acquisition of the plurality of sets of data that make up said reference data group is performed for a plurality of electronic devices of the same type as said electronic device that serves as the subject for condition appraisal during operation tests following the manufacture of said plurality of electronic devices,
   and the reference data group containing all of said plurality of sets of data acquired during the operation tests conducted on said plurality of electronic devices is employed as an initial reference data group for determining said index value calculation equation.

2. The abnormality diagnosing method as claimed in claim 1, wherein said electronic device of the same type as the electronic device that serves as the subject for condition appraisal is an electronic device contained in the same manufacturing lot as said electronic device that serves as the subject for condition appraisal.

3. The abnormality diagnosing method as claimed in claim 1, further comprising:
   acquiring said data of a plurality of types of information about said electronic device at prescribed update timings following an initiation of usage of said electronic device which is the subject of appraisal; and
   adding said acquired data to said reference data group to update said reference data group.

4. The abnormality diagnosing method as claimed in claim 3, wherein said index value is calculated on the basis of said index value calculation equation determined on the basis of said reference data group prior to updating and said acquired data and, when said index value is outside a prescribed range established in advance, said acquired data is not added to said reference data group.

5. The abnormality diagnosing method as claimed in claim 3, wherein when said reference data group is updated, said index value is calculated on the basis of said index value calculation equation determined on the basis of the updated reference data group and an initial specific single set of data that makes up said reference data group, and when the quantity of change of said index value falls continuously within a prescribed range established in advance a prescribed plurality of times, the updating of the reference data group is halted thereafter.

6. The abnormality diagnosing method as claimed in claim 1, wherein said reference data group is made up of individual data groups comprising data acquired about information that is affected by the usage conditions by a user of each of the electronic devices, of said plurality of types of information, and shared data groups comprising data acquired about the other information, and wherein said method further comprises:
   acquiring data that makes up said individual data groups about the electronic devices at prescribed timings following the initiation of usage of the electronic device which constitutes the subject for appraisal; and
   adding said acquired data to said individual data group to update said individual data group.

7. The abnormality diagnosing method as claimed in claim 6, further comprising:
   acquiring data that makes up said shared data groups about a plurality of other electronic devices of the same type as the electronic devices at prescribed timings following the initiation of usage of the electronic devices which constitutes the subject for appraisal; and
   adding said acquired data to said reference data group to update said reference data group.

8. The abnormality diagnosing method as claimed in claim 7, further comprising:
   sending said individual data group data and said shared data group data acquired for each of a plurality of electronic devices of the same type from the electronic devices to an abnormality diagnosis management apparatus by way of a communication line;
   using said management apparatus, accumulating said individual data group data about each of said plurality of electronic devices;
   accumulating said shared data group data for all of said plurality of electronic devices;
   determining said index value calculation equation that corresponds to each of the electronic devices based on said individual data group and said shared data group; and
   sending information for specifying said index value calculation equation from said management apparatus to the electronic devices by way of a communication line.

9. The abnormality diagnosing method as claimed in claim 1, further comprising:
   acquiring data of a plurality of types of information using the electronic devices during operation tests following the manufacture of each of the plurality of electronic devices of the same type;

sending the data acquired by the electronic devices from the electronic devices to an abnormality diagnosis management apparatus by way of a communication line;

using said management apparatus, determining said index value calculation equation on the basis of said reference data group in which data about the electronic devices is accumulated; and sending information for specifying said index value calculation equation from said management apparatus to electronic devices by way of a communication line.

10. The abnormality diagnosing method as claimed in claim 1, further comprising:

acquiring said data of a plurality of types of information by the electronic devices at a prescribed timing following the initiation of usage of each of the plurality of electronic devices of the same type by the user;

sending the data acquired by the electronic devices from the electronic devices to an abnormality diagnosis management apparatus by way of a communication line;

using said management apparatus, determining the index value calculation equation based on said reference data group in which data for the respective electronic devices is accumulated; and sending said index value calculation equation from said management apparatus to the electronic devices by way of a communication line.

11. The abnormality diagnosing method as claimed in claim 1, further comprising:

sending this predicted result from said electronic devices to the abnormality diagnosis management apparatus by way of a communication line when the occurrence of an abnormal condition of said electronic devices is predicted on the basis of said index value in said electronic devices.

12. The abnormality diagnosing method as claimed in claim 1, wherein said index value constitutes a Mahalanobis distance value calculated using the MTS (Mahalanobis Taguchi System).

13. The abnormality diagnosing method as claimed in claim 1, wherein said electronic device is an image forming apparatus.

14. An electronic device condition appraisal apparatus comprising:

an interface configured to acquire data of a plurality of types of information related to the condition of an electronic device;

a memory configured to store reference data groups made up of said data of a plurality of sets of a plurality of types of information acquired for an electronic device that serves as the subject for appraisal;

an index value determining unit configured to determine, based on said reference data group, an index value calculation equation for calculating an index value employed for the condition appraisal of the electronic device;

an index value calculation unit configured to calculate an index value based on said index value calculation equation and said data of a plurality of types of information acquired for said electronic device that serves as the subject for condition appraisal; and an appraisal unit configured to appraise, based on comparison results of said calculated index value and a reference value established in advance, the condition of said electronic device that serves as the subject for condition appraisal, wherein said memory stores the reference data group containing all of said plurality of sets of data acquired during operation tests conducted following the manufacture of a plurality of electronic devices of the same type as said electronic device that serves as the subject for condition appraisal as an initial reference data group for determining said index value calculation equation.

15. The condition appraisal apparatus as claimed in claim 14, further comprising:

an abnormality occurrence diagnostic unit configured to, based on the results of said condition appraisal, diagnose abnormality occurrence in said electronic device that serves as the subject for condition appraisal.

16. The condition appraisal apparatus as claimed in claim 14, further comprising:

a controller configured to, following the initiation of usage of said electronic device that serves as the subject for condition appraisal by a user, control said interface and said memory to acquire said data of a plurality of types of information for said electronic device at prescribed update timings, and add said acquired data is added to the reference data group stored in said memory to update said reference data group.

17. The condition appraisal apparatus as claimed in claim 16, wherein said controller is configured to calculate said index value based on said index value calculation equation determined on the basis of said reference data groups prior to updating and said acquired data and, when said index value is outside a prescribed range established in advance, said controller is configured to perform control so as not to add said acquired data to said reference data group.

18. The condition appraisal apparatus as claimed in claim 16, wherein in the updating of said reference data group, said controller is configured to calculate said index value on the basis of said index value calculation equation determined on the basis of the updated reference data group and an initial specific single set of data that makes up said reference data group, and when the quantity of change of said index value falls continuously within a prescribed range a prescribed plurality of times established in advance, said controller is configured to perform control to halt further updating of the reference data group.

19. The condition appraisal apparatus as claimed in claim 14, wherein said memory is configured to store said reference data group by dividing it into individual data groups comprising data acquired about information that is easily affected by the usage conditions by the user of each of the electronic devices, of said plurality of types of information, and shared data groups comprising data acquired about the other information, and said controller is configured to perform control to acquire the data that makes up said individual data groups for said electronic device at prescribed timings following the initiation of usage of said electronic device which constitutes the subject for appraisal by the user, and add said acquired data to said individual data groups to update said individual data groups.

20. The condition appraisal apparatus as claimed in claim 19, further comprising:

communication interface configured to communicate between said electronic device that serves as the subject for appraisal and a plurality of other electronic devices of the same type, wherein said controller, following the initiation of usage of said electronic devices that serves as the subject for condition appraisal by the user, is configured to perform control to receive data making up said shared data groups from said plurality of electronic devices at prescribed timings, and add said received data to said shared data groups to update said shared data groups.

21. The condition appraisal apparatus as claimed in claim 14, wherein said index value constitutes a Mahalanobis distance value calculated using the MTS (Mahalanobis Taguchi System).

22. The condition appraisal apparatus as claimed in claim 14, wherein said electronic device is an image forming apparatus.

23. An image forming apparatus comprising:
a condition appraisal unit configured to appraise the condition of an apparatus; and
an image forming unit configured to form an image on a recording medium,
wherein said condition appraisal unit comprises:
a data acquisition unit configured to acquire data of a plurality of types of information related to the condition of an electronic device;
a memory configured to store reference data groups made up of said data of a plurality of sets of a plurality of types of information acquired for an electronic device that serves as the subject for appraisal;
an index value determining unit configured to, based on said reference data group, determine an index value calculation equation for calculating an index value employed for the condition appraisal of the electronic device;
index value calculation unit configured to calculate an index value based on said index value calculation equation and said data of a plurality of types of information acquired for said electronic device that serves as the subject for condition appraisal; and
appraisal unit configured to, based on comparison results of said calculated index value and a reference value established in advance, appraising the condition of said electronic device that serves as the subject for condition appraisal,
wherein said memory is configured to store the reference data group containing all of said plurality of sets of data acquired during operation tests conducted following the manufacture of a plurality of electronic devices of the same type as said electronic device that serves as the subject for condition appraisal as an initial reference data group for determining said index value calculation equation.

24. The image forming apparatus as claimed in claim 23, further comprising:
an interface configured to communicate with an abnormality diagnosis management apparatus by way of a communication line; and
a controller configured to control said condition appraisal apparatus and said interface to acquire said data of a plurality of types of information at prescribed update timings during operation tests conducted following the manufacture of said image forming apparatus, and send said acquired data to said management apparatus.

25. The image forming apparatus as claimed in claim 24, wherein said controller is configured to control the interface to acquire said data of a plurality of types of information at prescribed update timings following the initiation of said image forming apparatus by the user, and send said acquired data to said management apparatus.

26. The image forming apparatus as claimed in claim 24, wherein said controller is configured to control the interface to acquire information for specifying said index value calculation equation determined for said image forming apparatus based on said reference data group from said management apparatus.

27. The image forming apparatus as claimed in claim 24, wherein said controller is configured to control the interface to send the predicted result to the data management apparatus, when the occurrence of an abnormal condition of said image forming apparatus is predicted on the basis of said index value by said condition appraisal apparatus.

28. A management apparatus for the centralized management of the abnormality diagnoses of a plurality of electronic devices via a communication line comprising:
an interface configured to communicate with said electronic devices or a condition appraisal apparatus for appraising the condition of said electronic devices;
a memory configured to store a reference data group comprising data of a plurality of information acquired for the electronic devices; and
a controller configured to control said interface and said memory to acquire said data of a plurality of types of information acquired at prescribed update timings during operation tests conducted following the manufacture of said electronic devices is received from said electronic devices or said condition appraisal apparatus, and add said received data to said reference data group to update said reference data group.

29. The management apparatus as claimed in claim 28, wherein said controller is configured to control the interface to receive said data of a plurality of types of information acquired at prescribed timings following the initiation of usage of each of the electronic devices by a user from said electronic device or said condition appraisal apparatus via a communication line, and add said received data to said reference data group to update said reference data group.

30. The management apparatus as claimed in claim 28, wherein said controller is configured to determine an index value calculation equation for calculating the index value employed for the condition appraisal of the electronic device based on said reference data group in which data for the electronic device is accumulated, and send information for specifying said index value calculation equation to said electronic device or said condition appraisal apparatus by way of a communication line.

31. The management apparatus as claimed in claim 30, wherein said index value constitutes a Mahalanobis distance value calculated using the MTS (Mahalanobis Taguchi System).

32. The management apparatus as claimed in claim 28, wherein said controller is configured to control the interface to receive the abnormality diagnosis result of said electronic device obtained on the basis of said index value in the electronic device from said electronic device or said condition appraisal apparatus by way of a communication line.

33. The management apparatus as claimed in claim 28, wherein said electronic device is an image forming apparatus.

34. A management system for the centralized control of the abnormality diagnoses of a plurality of electronic devices by way of a communication line comprising:
a management apparatus; and
a plurality of electronic devices configured to communicate with said management apparatus by way of a communication line or a condition appraisal apparatus for appraising the condition of said electronic devices,
wherein said management apparatus comprises
an interface configured to communicate with said electronic devices or a condition appraisal apparatus for appraising the condition of said electronic devices;
a memory configured to store a reference data group comprising data of a plurality of information acquired for the electronic devices; and a controller configured to control said interface and said memory to receive said data of a plurality of types of information acquired at prescribed update timings during operation tests conducted following the manufacture of said electronic devices from said electronic devices or said condition appraisal apparatus and add said received data to said reference data group to update said reference data group.

* * * * *